United States Patent [19]
Zhu

[11] Patent Number: 5,943,159
[45] Date of Patent: Aug. 24, 1999

[54] METHOD AND APPARATUS FOR OPTICAL BEAM STEERING

[76] Inventor: Tom Yuxin Zhu, 2517 White Oak La., Lisle, Ill. 60532

[21] Appl. No.: 08/644,992

[22] Filed: May 14, 1996

[51] Int. Cl.⁶ ................................................. G02G 1/29
[52] U.S. Cl. .......................................... 359/316; 359/254
[58] Field of Search ................................. 359/315, 316, 359/318, 319, 254, 279; 349/143, 145, 146

[56] References Cited

U.S. PATENT DOCUMENTS

| | | | |
|---|---|---|---|
| 3,626,511 | 12/1971 | Hammer | 359/316 |
| 3,650,602 | 3/1972 | Lee et al. | 350/160 |
| 3,691,484 | 9/1972 | Dore | 332/7.51 |
| 4,386,827 | 6/1983 | Scifres et al. | 359/315 |
| 4,639,091 | 1/1987 | Huignard et al. | 350/347 |
| 4,706,094 | 11/1987 | Kubick | 343/754 |
| 4,964,701 | 10/1990 | Dorschner et al. | 350/336 |
| 5,059,008 | 10/1991 | Flood et al. | 359/196 |
| 5,061,048 | 10/1991 | Hayden et al. | 359/315 |
| 5,067,829 | 11/1991 | Jaskie et al. | 385/8 |
| 5,093,740 | 3/1992 | Dorschner et al. | 359/88 |
| 5,093,747 | 3/1992 | Dorschner | 359/316 |
| 5,126,869 | 6/1992 | Lipchak et al. | 359/94 |
| 5,151,814 | 9/1992 | Grinberg et al. | 359/209 |
| 5,223,971 | 6/1993 | Magel | 359/295 |
| 5,233,673 | 8/1993 | Vali et al. | 385/3 |
| 5,253,033 | 10/1993 | Lipchak et al. | 359/298 |
| 5,373,393 | 12/1994 | DeJule et al. | 359/315 |

OTHER PUBLICATIONS

McManamon, Watson, Dorschner and Barnes, Applications Look at the Use of Liquid Crystal Writable Gratings for Steering Passive Radiation, Optical Engineering/Nov. 1993/vol. 32, No. 11, pp. 2657–2664.

Brookner, Phased–Array Radars, Scientific American, Feb. 1985, pp. 94–102.

Resler et al. "High–efficiency Liquid–Crystal Optical Phased–array Beam Steering", Optics Letters, May 1, 1996/vol. 21, No. 9, pp. 689–691.

Primary Examiner—Georgia Y. Epps
Assistant Examiner—Dawn-Marie Bey
Attorney, Agent, or Firm—Ladas & Parry

[57] ABSTRACT

An optical beam steering device for steering a beam of light includes a first window having a common electrode, a second window having a plurality of control electrodes, and a layer of electro-optical material intermediate the first and second windows. The common electrode, the control electrodes, and the electro-optical material form an array of phase shifters within the optical array. Each phase shifter has a width substantially greater than a wavelength of the beam of light. Also included is a means for establishing an effective position of the phase shifters so that a single beam of light of peak intensity exits the optical array where the single beam of light is steerable through a predetermined angle.

70 Claims, 15 Drawing Sheets

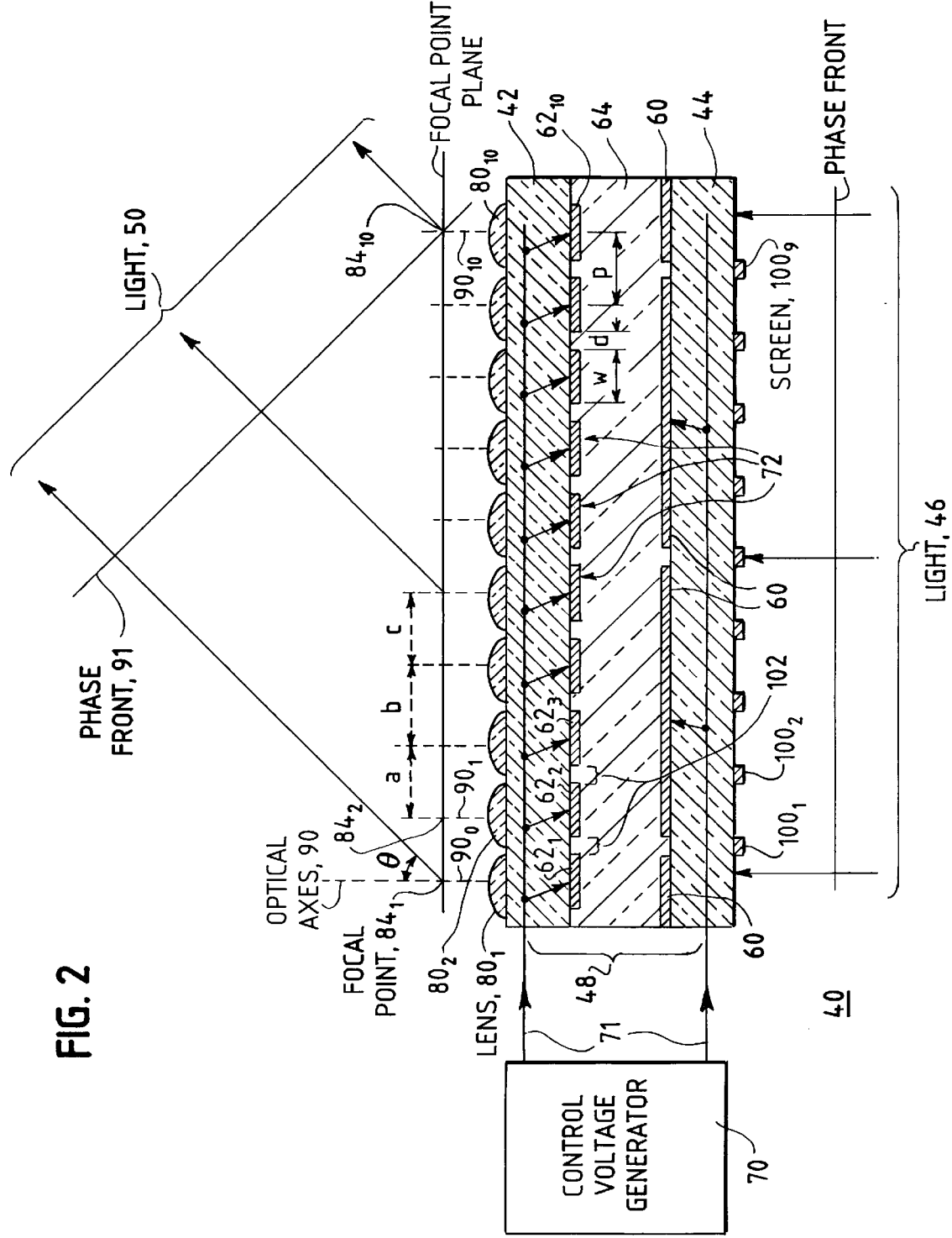

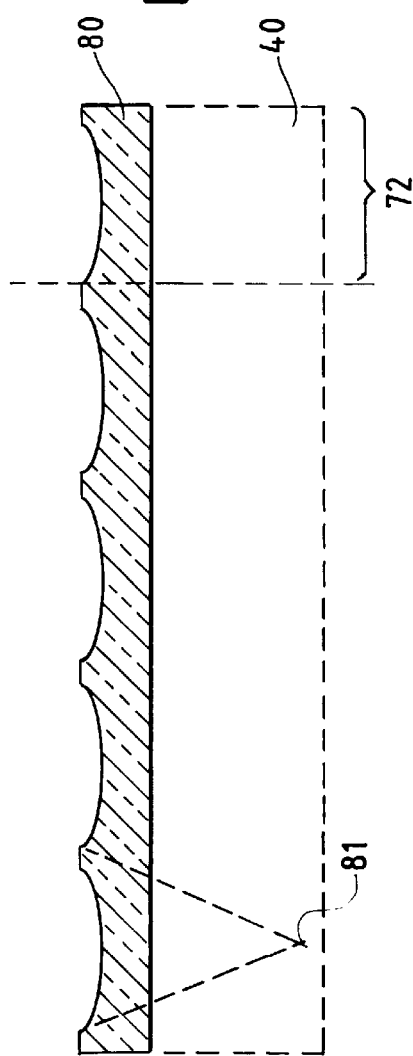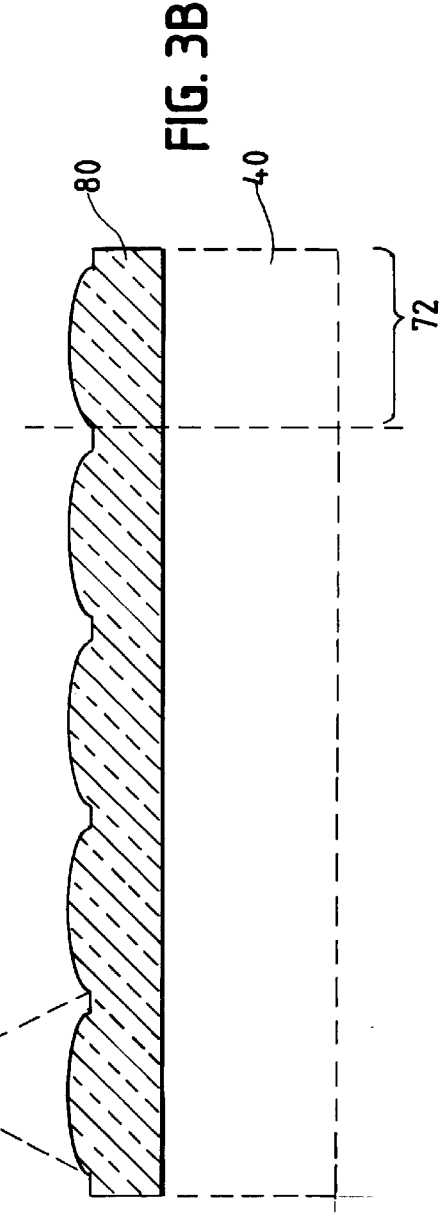

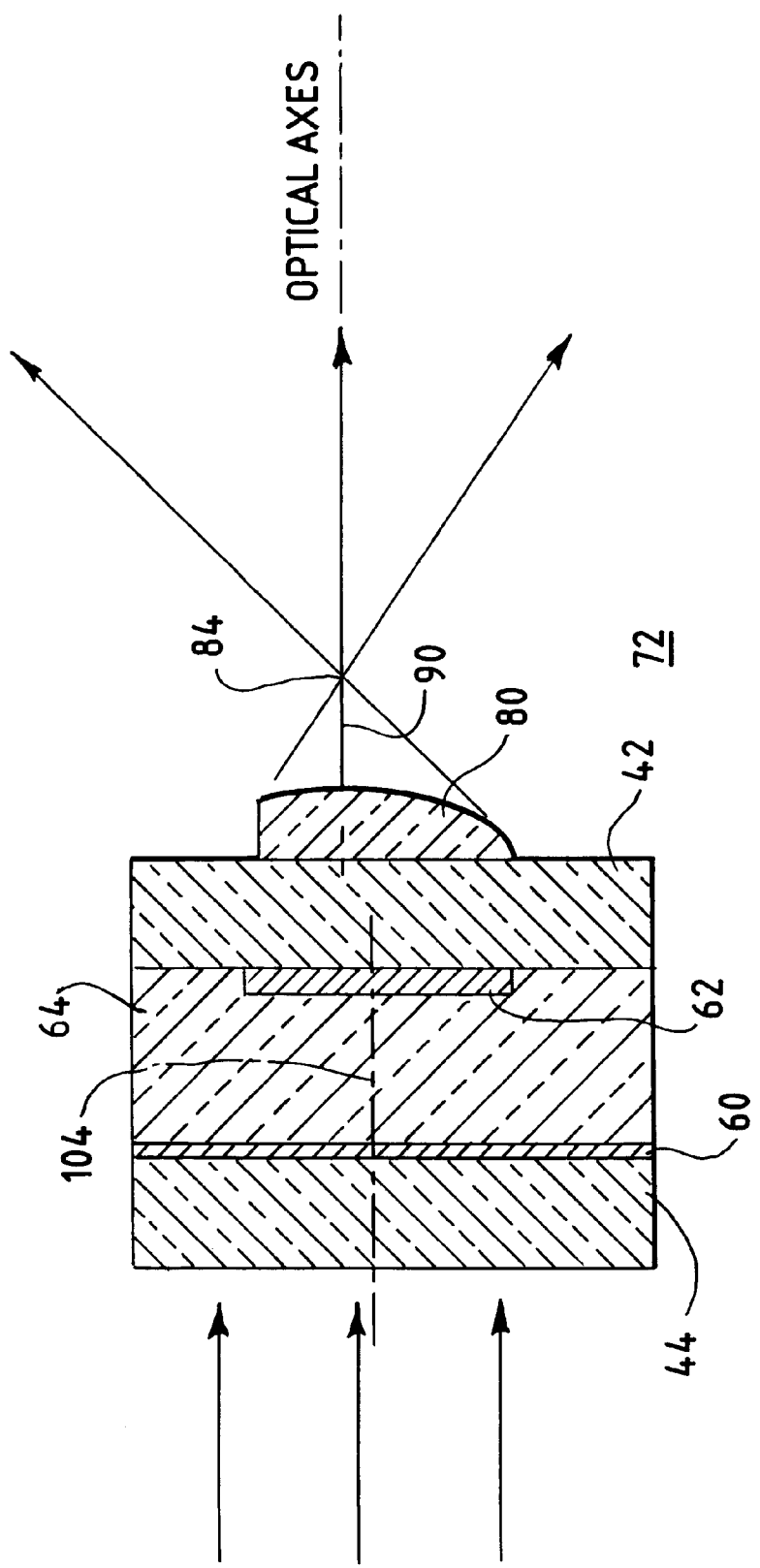

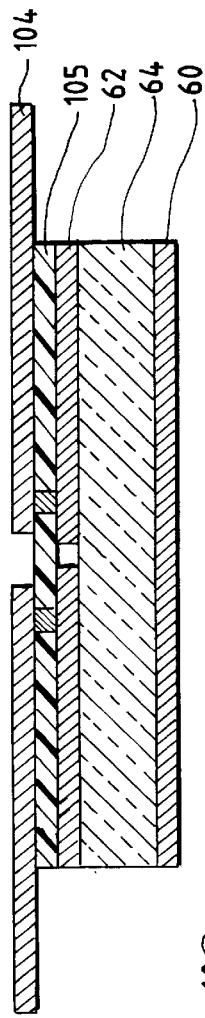
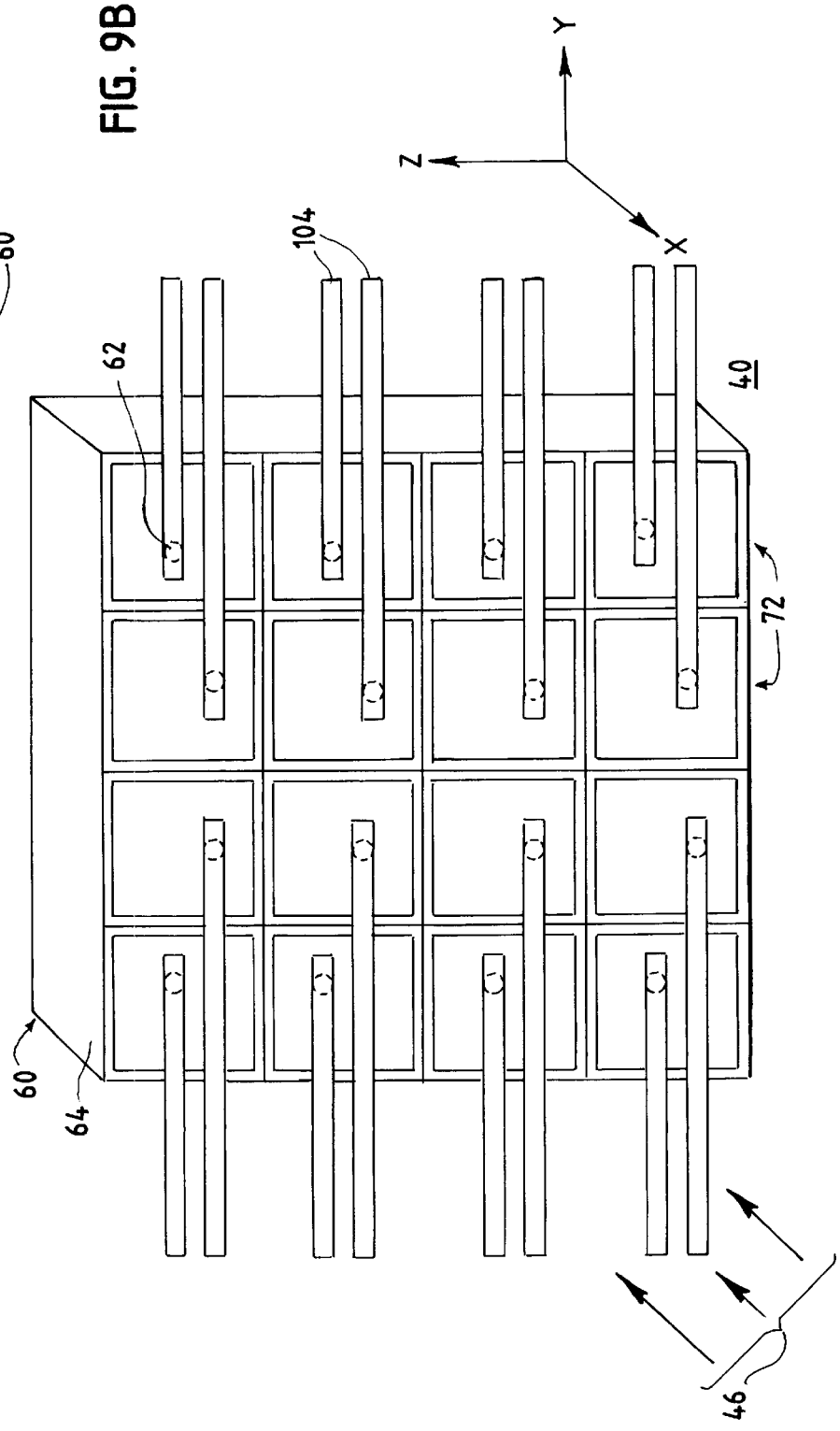

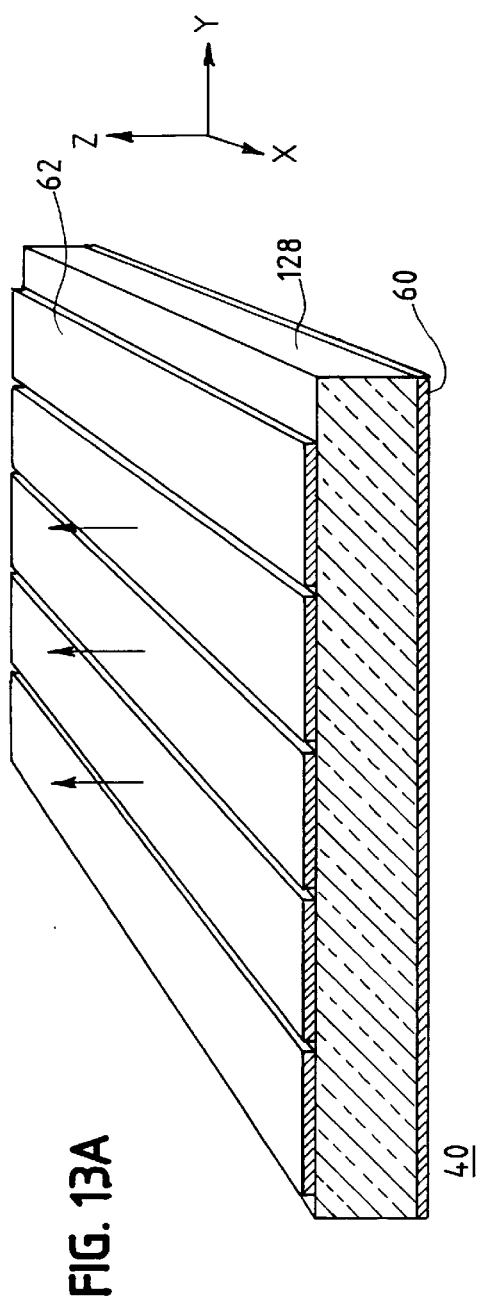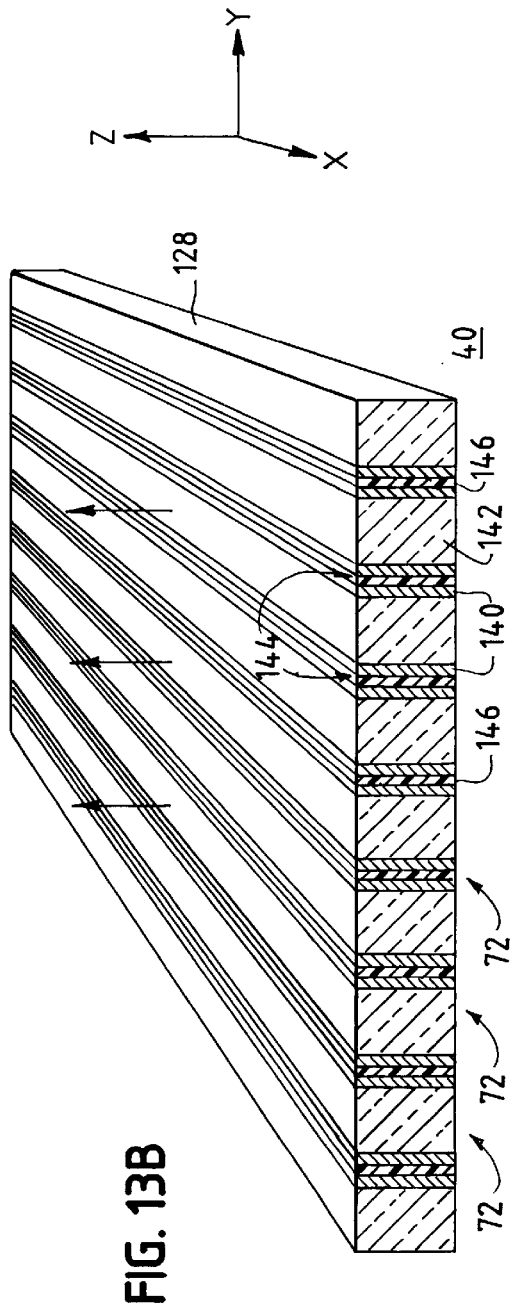

METHOD AND APPARATUS FOR OPTICAL BEAM STEERING

BACKGROUND OF THE INVENTION

The present invention relates generally to optical devices and more specifically to an optical phased array that electronically steers a beam of light.

Prior art phased array optical beam steering devices and methods typically limit the size of phase shifter to less than the wavelength of the light to be steered in order to achieve high performance and large-angle beam steering. However, many practical problems exist when the size of the phase shifters is small. One problem is that an extremely large number of phase shifters are required. For light having of wavelength of 1 $\mu$m, if the size of phase shifter is 1 $\mu$m, then 10,000 phase shifters per centimeter of array are required (neglecting the spacing between each phase shifter). Since apertures size up to one meter in diameter may be desired, the total number of phase shifters in an array may exceed 1,000,000. This results in extremely complex and expensive interconnection schemes.

Additionally, use of such small phase shifters results in inefficient use of available substrate area. For example, a typical array may include phase shifters that are 1 $\mu$m in width having a separation of not less than 0.1 $\mu$m between phase shifters. In such an arrangement, the space between the phase shifters is essentially wasted and represents ten percent of the available area. If the width of each phase shifter is decreased to 0.5 $\mu$m, then the wasted area comprises twenty percent of the available area. Clearly, this is inefficient and wasteful.

Another more difficult problem exists. For a phase shifter having a width approximately equal to the wavelength of light, the light beam entering the phase shifter diverges as it propagates through the phase shifter. It is virtually impossible to maintain the size of the beam as it passes through the phase shifter, thus only a small portion of light eventually passes through the phase shifter while the remaining portion of the light beam travels through neighboring phase shifters. Accordingly, only a small portion of light emerging from each phase shifter has the desired phase while the remaining portion of the light emerging from neighboring phase shifters has an incorrect phase. Therefore, even if an extremely large numbers of phase shifters can be successfully integrated, the performance of the device is relatively poor. Also, since the length (or the thickness) of the phase shifter is typically about 10 $\mu$m, and is much larger than the width, the edge effect is very strong. Due to the edge effect, the electric field is not uniform within the phase shifter resulting in a variation of the refractive index within the phase shifter. Therefore, even for the small portion of light passing through the phase shifter, the phase shifts are not equal.

An example of a known optical beam steering device is disclosed in U.S. Pat. No. 5,093,740 issued on Mar. 3, 1992 to Dorschner et al. This device uses phase shifters having general spacing of about one-half of the wavelength of light. This results in a one-dimensional phase shifter density of about 20,000 per centimeter, if the wavelength of the light is 1 $\mu$m. The reference discloses that manufacture of sub-micron geometry is feasible but interconnecting such a large array of phase shifters appears to be a monumental task. The reference device seeks to overcome the task of interconnecting the vast number of phase shifters by dividing the array into sub-arrays interconnected in a parallel arrangement. This significantly increases the complexity and manufacturing cost of the device. Additionally, as the size of the array is increased, the number of interconnections again becomes problematic. Another problem in this prior art approach is that it limits the number of addressable beam directions to a few discrete positions due to the phase mismatch between sub-arrays.

Accordingly, it is an object of the present invention to substantially overcome the above-described problems.

It is another object of the present invention to provide a novel optical beam steering device and method having a plurality of phase shifters to steer the beam of light.

It is a further object of the present invention to provide a novel optical beam steering device having a plurality of phase shifters where the dimension of the phase shifter is much greater than the wavelength of light so that the number of connections to the array is greatly reduced.

It is also an object of the present invention to provide a novel optical beam steering device and method where a single peak beam is produced by providing irregular spacing between phase shifters.

It is still an object of the present invention to provide a novel optical beam steering device where the beam divergence within the phase shifter is minimized.

It is yet another object of the present invention to provide a novel optical beam steering device having a lens associated with each phase shifter to permit large-angle beam steering. It is still a further object of the present invention to provide an optical beam steering device and method having lenses for shifting an optical axis.

SUMMARY OF THE INVENTION

The disadvantages of present optical beam steering devices and steering methods are substantially overcome with the present invention by providing a novel phased array optical beam steering device and method.

One embodiment of the present invention employs an array of phase-controlled radiating elements, such as phase shifters, where each phase shifter may be very large relative to the wavelength of light to be steered. The width of each phase shifter may be a few thousand times the wavelength of the light to be steered. For example, the width of each phase shifter may be in the range of approximately 2 to over 10,000 times the wavelength of the light propagating through the phase shifter. Preferably, the phase shifter is one hundred to a few thousand times the wavelength of the light. If the space between adjacent phase shifters is small, typically 1 $\mu$m, then the wasted area between phase shifters is very small relative to the total area, and efficiency is maximized. The efficiency is primarily maximized because almost no divergence occurs as the light propagates though the phase shifters.

However, when the size of phase shifter is significantly larger than the wavelength of light, the beam of light passing through the phase shifter will propagate ahead with little divergence. Therefore, steering the beam through a large angle is impossible. The present invention solves this problem by using a lens in front of each phase shifter. A convergent lens focuses the beam light at a focal point to create an effective point source of light at the focal point. The light diverges at a large angle as it passes beyond the focal point. The focal point of the lens represents the effective position of the phase shifter or array of elements. The focal point of the lens is used to determine the phase relationship needed for steering the beam of the light. Preferably, each lens associated with each phase shifter has an identical focal length, thus their focal points lie in a single plane. In other words, there exists an array of lenses in association with an array of phase shifters where the array of lenses creates an array of the focal points. The array of the focal points then represents the effective geometry of the phased array.

Although employment of the lenses solves the above-described problem, other problems exist. The large size of the phase shifters inevitably results in large distances between the elements of the phased array, i.e. the distance between the adjacent focal points (effective distance). In a conventional phased array, multiple output beams are produced which are extremely undesirable. This is the primary reason why prior art phase shifters have widths equal to about one-half of the wavelength of light. The present invention solves the above-described problem by utilizing an irregular phased array, i.e. the distances between the array elements is not constant. Rather, the effective distance between the array elements is a random but precisely known value, within a predetermined range. The effective position of the array elements can be anywhere within the given range with equal probability. The effective position of the array elements forms a random pattern which eliminates multiple output beams.

The irregular phased array may be formed by physically placing each phase shifter according to a predetermined irregular pattern or may be formed by simply shifting the optical axis of the lenses. The lenses are asymmetrical and the optical axis of lenses are not necessarily at the center of the lenses. Since the focal points of the lenses represent the effective position of the phase shifters, an irregular phased array may be formed by simply creating an irregular array of the focal points of the lenses, even if the phase shifters are placed in a uniform pattern. The result of these two methods is essentially the same. A single peak beam is produced by application of a control signal to the electrodes of the phase shifters to produce a progressive phase shift in successive phase shifters with phase resets occurring at $2\pi$ intervals.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 2 is a cross-sectional view of a specific embodiment of a phased array optical beam steering device according to the present invention;

FIGS. 3A and 3B are cross-sectional views of an alternate embodiment of a lens array;

FIG. 4 is an enlarged cross-sectional view of an individual phase shifter particularly illustrating a shifted optical axis and focal point of the lens;

FIGS. 8, 9A, 9B, and 10 are alternate embodiments of the present invention illustrating construction of a two-dimensional array of phase shifters;

FIGS. 13A–13B are perspective views of alternate embodiments illustrating construction of a two-dimensional array of phase shifters using solid electro-optical material.

DETAILED DESCRIPTION OF THE INVENTION

Figure 1B:
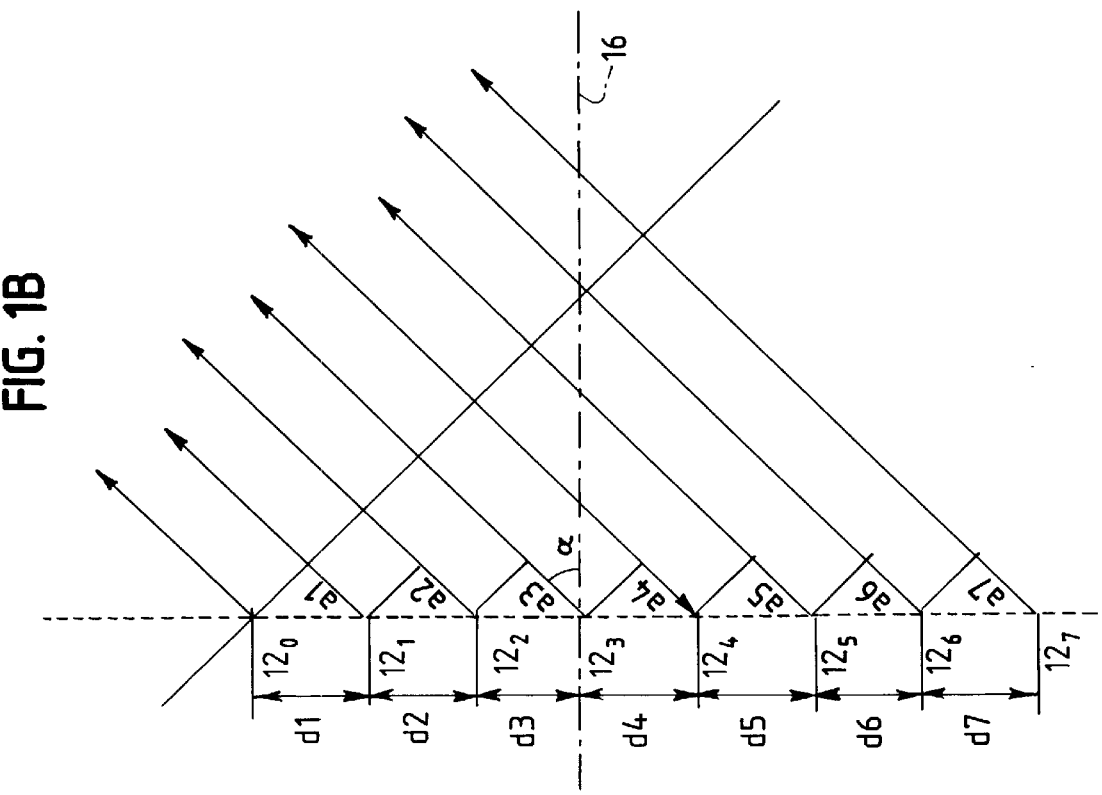
FIGS. 1A–1B are a schematic diagrams of a simplified optical array used to illustrate the principles of the present invention.
Figure 1A:
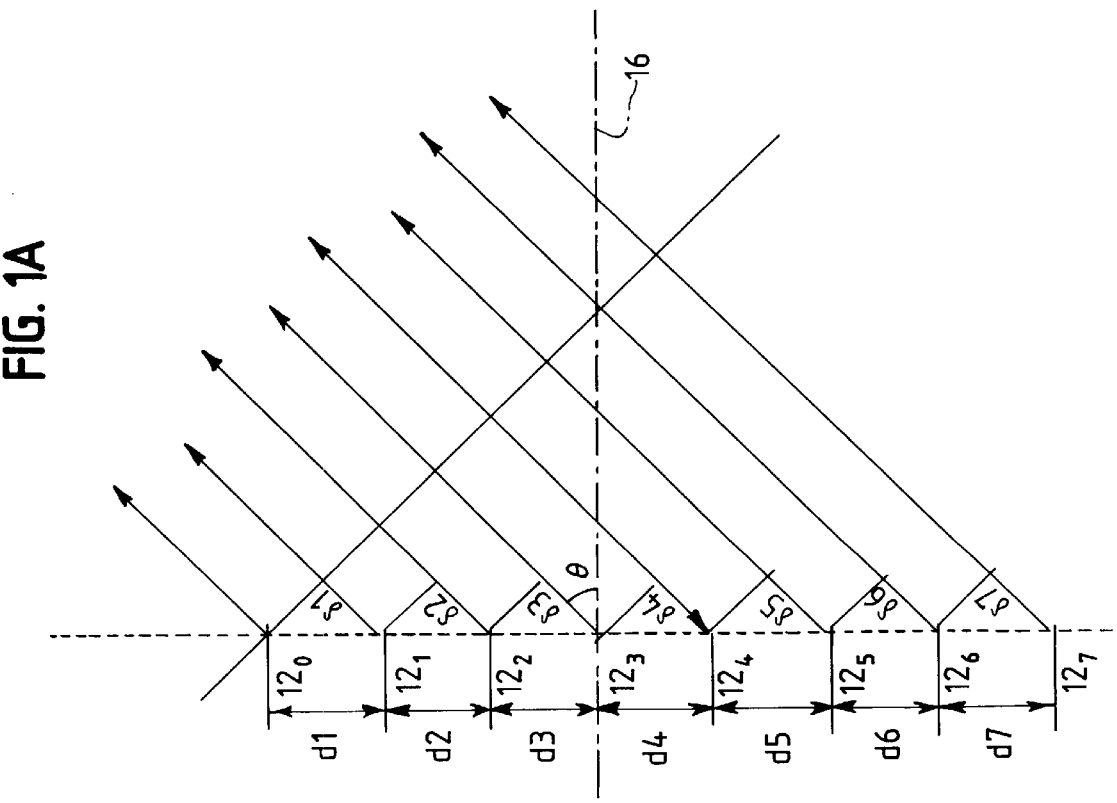

Referring now to FIGS. 1A and 1B. For purposes of illustration, eight elements of an array $12_0$–$12_7$ are shown. Each of the eight elements $12_0$–$12_7$ are defined to be point sources of light and emit light rays 14 in all directions, shown in FIGS. 1A and 1B exiting the array to the right. The distance between adjacent elements $12_0$–$12_7$ is denoted as d1, d2 . . . d7.

Referring now to FIG. 1A, the optical path difference or the retardation between light from adjacent elements $12_0$–$12_7$ in a direction θ is denoted as δ1, δ2 . . . δ7. If light in the direction of θ from each of the elements $12_0$–$12_7$ are all in-phase, there exists all constructive interference in this direction, and the output beam of light is said to be in the direction of θ. In order to have the light from each of the elements $12_0$–$12_7$ be in-phase in the direction of θ, the phase of the light from each of the elements must be adjusted accordingly to compensate for the optical path differences δ1, δ2, . . . δ7, where δ1, δ2 . . . δ7 are calculated as follows:

$$\delta 1 = d1\sin(\theta), \delta 2 = d2\sin(\theta) \ldots \delta 7 = d7\sin(\theta).$$

The following phase adjustment is required:

For element 1, δ1 $2\pi/\lambda$ ahead of element 0.

For element 2, δ2 $2\pi/\lambda$ ahead of element 1 . . .

For element 7, δ7 $2\pi/\lambda$ ahead of element 6.

A $2\pi$ phase reset is employed in above phase adjustment. For example, if δ1 $2\pi/\lambda$=k1 $2\pi$+ω1, where k1 is a integer, and ω1<$2\pi$, then the actual phase adjustment needed for element 1 is ω1.

Now referring to FIG. 1B, the array of elements $12_0$–$12_7$ is the same array as shown in FIG. 1A. If the phase of light is adjusted according to the above-described values, then the light is all in-phase in the direction of θ. Is it possible to find a direction α, other than θ, such that light is all in-phase in the direction of α? The optical path difference (or retardation) in the direction α is denoted as a1, a2, . . . a7, as shown in FIG. 1B and is calculated as follows:

$$a1 = d1\sin(\alpha), a2 = d2\sin(\alpha) \ldots a7 = d7\sin(\alpha).$$

The phase differences in the direction of α, denoted as Φ1, Φ2, . . . Φ7 for element $12_1$, $12_2$ . . . $12_7$ respectively, is the initial phase difference plus the phase difference due to the optical path differences (or retardation) a1, a2 . . . a7. The phase differences are determined as follows:

$$\Phi 1 = \delta 1\ 2\pi/\lambda - a1\ 2\pi/\lambda,$$

$$\Phi 2 = \delta 2\ 2\pi/\lambda - a2\ 2\pi/\lambda \ldots$$

$$\omega 7 = \delta 7\ 2\pi/\lambda - a7\ 2\pi/\lambda$$

for elements $12_1$, $12_2$ . . . $12_7$ respectively. The phase differences may be rewritten as follows:

$\Phi 1 = d1 \ (\sin(\theta) - \sin(\alpha)) 2\pi/\lambda,$ $\Phi 2 = d2 \ (\sin(\theta) - \sin(\alpha)) 2\pi/\lambda \ldots$ $\Phi 7 = d7 \ (\sin(\theta) - \sin(\alpha)) 2\pi/\lambda$ Therefore: $\Phi 1 = n1 \ 2\pi$, $\Phi 2 = n2 \ 2\pi \ldots \Phi 7 = n7 \ 2\pi$. If $n1, n2 \ldots n7$ are all integers, then the light is all in phase in the direction of $\alpha$. Now assuming that at some value of $\alpha$, $n1$ is an integer, we have the following:

$n1 \ 2\pi = d1 \ (\sin(\theta) - \sin(\alpha)) \ 2\pi/\lambda$

The above expression is substituted this into the equation for $\Phi 2$ resulting in:

$\Phi 2 = d2 \ n1 \ 2\pi/d1 = n2 \ 2\pi,$ where $n2 = n1 \ d2/d1$. Similarly, we have $n3 = n2 \ d3/d2 \ldots n7 = n6 \ d7/d6$. Unless $d1, d2 \ldots d7$ are equal to each other (or have some special relationship, e.g. the ratio between $d1$, $d2 \ldots d7$ in an integer value), $n2, n3 \ldots n7$ cannot be all integers. In other words, if the distance between elements $12_0$–$12_7$ of the phased array are not equal and have no fixed relationship, it is impossible to find an all in phase case in a direction other than in the direction in which the phased array is purposely steered, i.e. the direction of $\theta$. Generally, for an irregular phased array (i.e. $d1 \ d2 \ d3 \ldots d7$) regardless of the value of the distance between elements, there is only one output beam.

In the case of a regularly spaced phased array, the distance between elements $12_0$–$12_7$ is equal, where the distance is denoted as $d1 = d2 = \ldots = d7 = d$. Then we have: $\Phi 1 = \Phi 2 = \ldots \Phi 7 = \Phi$. The above equations are simplified and result in the following expression:

$\sin(\theta) - \sin(\alpha) = n\lambda/d, \ where \ n = 0, \pm 1, \pm 2, \pm 3,$ This represents the condition where light is all in phase in the direction of $\alpha$. The equation may be rewritten as:

$\sin(\theta) = \sin(\alpha) - n\lambda/d \ when \ n = 0, \ \sin(\theta) = \sin(\alpha), \ or \ \theta = \alpha.$ For $\theta > 0$ (for the following, we will consider $\theta > 0$ only, for case of $\theta < 0$, the analysis is identical), and the following condition exists:

$0 < \sin(\alpha) - n\lambda/d \ 21 \ 1.$

Since $\sin(\theta)$ cannot be larger than one, $\sin(\theta)$ equal to one is the case where $\theta = 90°$ and practically, this is of little interest.

For $\lambda = d$, $0 < \sin(\alpha) - n < 1$, $n = -1$ satisfies the above condition. The direction having light all in phase in the direction of $\alpha$ is determined by following expression:

$\sin(\alpha) = \sin(\theta) - 1.$

For example, if the desired beam direction is at $\theta = 45°$, one more undesirable beam will be produced at $-17°$. If $\theta = 30°$, another undesirable beam is produced at $-30°$.

For $d = 2\lambda$, $0 < \sin(\theta) - n/2 < 1$ or $n/2 < \sin(\theta) < 1 + n/2$. The following possible cases exist to satisfy the above condition:

For $n = 1$, $0.5 < \sin(\alpha) < 1.5$

For $n = -1$, $-0.5 < \sin(\alpha) < 0.5$

For $n = -2$, $-1 < \sin(\alpha) < 0$

For $n = -3$, $-1.5 < \sin(\alpha) < -0.5$

For a general value of $\theta$, $0 < \theta < 90°$, not all of the above cases are true for the same value of $\theta$. The direction of the beam is determined by substituting the above values for n into the following equation:

$\sin(\alpha) = \sin(\theta) + n/2.$

Similar analysis can be applied for other values of d. The larger the value of d, the greater the number of additional undesirable output beams.

Next, the largest value of d that yields one beam only at the direction desired is calculated.

For $d = \lambda/2$, $0 < \sin(\alpha) - 2n < 1$, there exist no values for n to satisfy the condition. But it is found that:

For $n = 1$, $\sin(\alpha) = \sin(\theta) + 2$. This is true only when $\theta = -90°$ and then $\alpha = 90°$.

For $n = -1$, $\sin(\alpha) = \sin(\theta) - 2$. This is true only when $\theta = 90°$ and then $\alpha = -90°$.

Thus, $\lambda/2$ is the maximum value of d such that only a single output beam exists when the array is regularly spaced.

In fact, for a regular array, i.e. the distance between elements $12_0$–$12_7$ (center-to-center distance) is all equal, there exists only one output beam in the desired direction if the distance between elements is less than $\lambda/2$. For distances larger than $\lambda/2$, there may be more than one output beam, depending on the value of $\theta$. For distance larger than $\lambda$, there is always at least one additional undesirable output beam.

The above analysis illustrates why prior art phased arrays have elements separated by less than $\lambda/2$, or at least less than $\lambda$. However, as shown above, an irregular phased array, (i.e., an array having unequal distances between array elements, and the distances having no fixed relationship to each other) a single output beam at the desired direction can be produced such that no other output beams in any other directions exist, regardless of the distance between elements. Here, an irregular array means that the position of each array element is random and follows a uniform distribution within the given range of variation. The array element has equal probability to have any position within the given range of variation. The actual position of an array element, although irregular, is known. Furthermore, if the number of array elements are large, i.e. few hundred or more, light at undesired directions is effectively canceled out, i.e. the light intensity is close to zero.

These array elements $12_0$–$12_7$ can be any kinds of phase-controlled light emitting sources or emitters. These array elements can also be phase-controlled radiation or optical steering elements, such as phase shifters.

Referring now to FIG. 2, a cross-sectional view of a phased array optical beam steering array 40 is shown. The array 40 includes a front window 42 and a rear window 44, both of which are optically transparent at the frequency range of interest. The windows 42 and 44 are generally planar and parallel to each other. Incident light rays 46 enter the rear window 44 and pass through the body 48 of the array 40. Light exits the array 40 through the front window 42 and is shown schematically as light rays 50, which have been steered through an angle of $\theta$. In the illustrated embodiment of FIG. 2, beam steering in a single direction is shown for the purposes of clarity. However, the principles disclosed herein are generalizable to beam steering in two dimensions, as will be described hereinafter.

One or more common electrodes 60 are affixed to the rear window 44 and are electrically conductive and optically transparent at the frequency range of interest. For example, the range of light frequencies may range from ultraviolet light having a wavelength range of about between 0.04–0.4 $\mu m$, through visible light having a wavelength range of about between 0.4–0.7 $\mu m$, to infra-red light having a wavelength range of about between 0.7 $\mu m$–1.0 mm. More than one common electrode 60 may exist, as will be described in greater detail hereinafter. A plurality of electrodes stripes $62_1$–$62_{10}$, collectively referred as electrodes, electrode stripes 62, or control electrodes, are affixed to the front window 42. The electrodes 62 (control electrodes) are arranged as a plurality of parallel stripes. Note that the position of the control electrodes 62 and the common electrode 60 may be reversed. That is, the control electrodes may be affixed to the rear window 44 and the common electrodes may be affixed to the front window 42 without affecting operation of the array 40.

A width of each electrode stripe 62 is denoted as "w", a center-to-center distance between adjacent electrodes stripes is denoted as "p", and a spacing between adjacent electrodes stripes is denoted as "d". The space between the common electrode 60 and the electrode stripes 62 is filled with a layer of electro-optic material 64 (e.g. liquid crystal material or a solid electro-optical material) having electro-optical properties. The liquid crystal molecules of the material 64 are long, thin, rod-like organic molecules which are in a "nematic" phase and respond to an electric field.

A control voltage generator 70 is connected to the common electrodes 60 and the electrode stripes 62 and provides control signals 71 to the electrode stripes. The control signals 71 provide differing electrical potential to successive electrode stripes 62. This results in generation of a differential electric field strength in the region between the individual electrode stripes 62 and the common electrodes 60. This creates local variations of the refractive index in the electro-optical material 64 which results in beam steering.

Each electrode stripe 62 in combination with the common electrode 60 and the liquid crystal material 64 form a phase shifter 72, where the plurality of electrode stripes $62_1$–$62_{10}$ form an array of phase shifters $72_1$–$72_{10}$, collectively referred to as phase shifters of the array 40 of phase shifters. Alternately, the phase shifters 72 will be referred to interchangeably as elements 12 of the array 40. Each individual electrode stripe 62 controls a single phase shifter 72. The phase relationship between the beams of light passing through the phase shifters 72 is individually adjustable by modifying the electrical potential applied to each electrode stripe 62 relative to the common electrode 60.

As described above, the width w of each phase shifter 72 is much greater than the wavelength of the light passing through the phase shifter. For example, in the illustrated embodiment, the width w may be a few hundred to a few thousand times greater than the wavelength of the light. For example, the width w of each phase shifter 72 may be about 500 times greater than the wavelength of the light. However, the width of each phase shifter 72 may be chosen according to the size of the aperture needed and the number of phase shifters required.

Note, that for purposes of illustration, the array 40 is shown having ten electrodes $62_1$–$62_{10}$ (control electrodes) forming ten individual phase shifters $72_1$–$72_{10}$. Practical arrays 40 will include many more individual phase shifters 72. For example, such a practical array 40 may have more than one-thousand phase shifters. Alternately, each phase shifter may be constructed from waveguides or optical fibers.

Prior art light beam steering devices cannot use such large width phase shifters 72 due to inherent problems associated therewith. As described above, one such problem includes creation of multiple peaks. Another problem associated with large width phase shifters 72, as described above, is that the beam of light will retain its size after it exits the phase shifters 72. The beam of light will generally retain its size and shape as it propagates through the phase shifter 72, and will retain its shape after it exits the phase shifter. In order to steer the beam of light, the light from each individual phase shifter 72 must be spread over the entire space through which the beam of light is to be steered.

Referring now to FIGS. 2, 3A, and 3B, FIG. 2 illustrates an array of optical focusing elements or lenses $80_1$–$80_{10}$, collectively referred to as lenses 80, placed at the front of each phase shifter 72, while FIGS. 3A and 3B illustrate an alternate embodiment where the array of lenses is formed directly on the front window 42 of the array 40. As shown in FIG. 3A, a concave lens 80 may be used where the focal point 81 of the lens is a virtual focal point located behind the lens of the array 40. It is this focal point 81 that is used to calculate the phase relationship required between the elements of the array 40.

As shown in FIG. 3B, a convex lens 80 may be used where the light converges at a focal point 82 and diverges as the light travels away from the focal point. Either form of lens 80 (convex or concave) may be used, provided that the light exiting the lens is diverged so that interference exists between the light exiting the phase shifters 72 of the array.

The array of optical focusing elements or lenses $80_1$–$80_{10}$ overcomes the above-described problem of non-divergence of the light. As shown in FIG. 2, the lenses 80 are affixed to the front window 42 and correspond to each phase shifter 72. In order to spread the light from each individual phase shifter 72 over the entire space through which beam steering is desired, the light beam from each phase shifter 72 is directed through the lens 80 and is focused and then diverged at a large angle (for the convex lens of FIG. 3B), as show by the light beam 50 in FIG. 2 and 3B.

Referring now to FIGS. 2 and 4, FIG. 4 is an enlarged view of a single phase shifter 72. The lens 80 of each phase shifter 72 has focal points $84_1$–$84_{10}$ (FIG. 2), collectively referred to as focal points 84. The focal points 84 of the lenses define the effective positions of the phase shifters or the effective positions of the array elements. The focal point 84 appears as a point source of light having specified phase. A wavefront of the emitted light is shown as line 91 (FIG. 2). For example, to deflect the light beam at an angle θ to produce the illustrated wavefront 90, the phase of light at focal points $84_1$–$84_{10}$ must have a relationship such that the phase at focal point $84_2$ must lead the focal point $84_3$ by $(2\pi/\lambda)(a)\sin\theta$ and the phase at focal point $84_3$ must lead the focal point at $84_4$ by $(2\pi/\lambda)(b)\sin\theta$, and so forth.

For an array 40 that scans only in one dimension, the lenses $80_1$–$80_{10}$ are arranged as a plurality of lens stripes or cylindrical lenses which extend along the length of the electrodes $62_1$–$62_{10}$ (control electrodes). The lenses $80_1$–$80_{10}$ preferably have identical focal lengths, e.g. their focal points $84_1$–$84_{10}$ are located at the same distance from the front window 42. The optical axis of each lens 80 is shown by lines $90_1$–$90_{10}$ (FIG. 2) where reference letters a, b, and c (FIG. 2) represent the distance between optical axes of adjacent lenses where generally, a b c.

In preferred embodiment, the size of the lens 80 is greater than or equal to the size of the individual electrodes 62 in order to collect all of the light passing through the corresponding phase shifter 72. To produce an array 40 that scans in two dimensions, two variations are possible, as will be described as follows.

Figure 5:
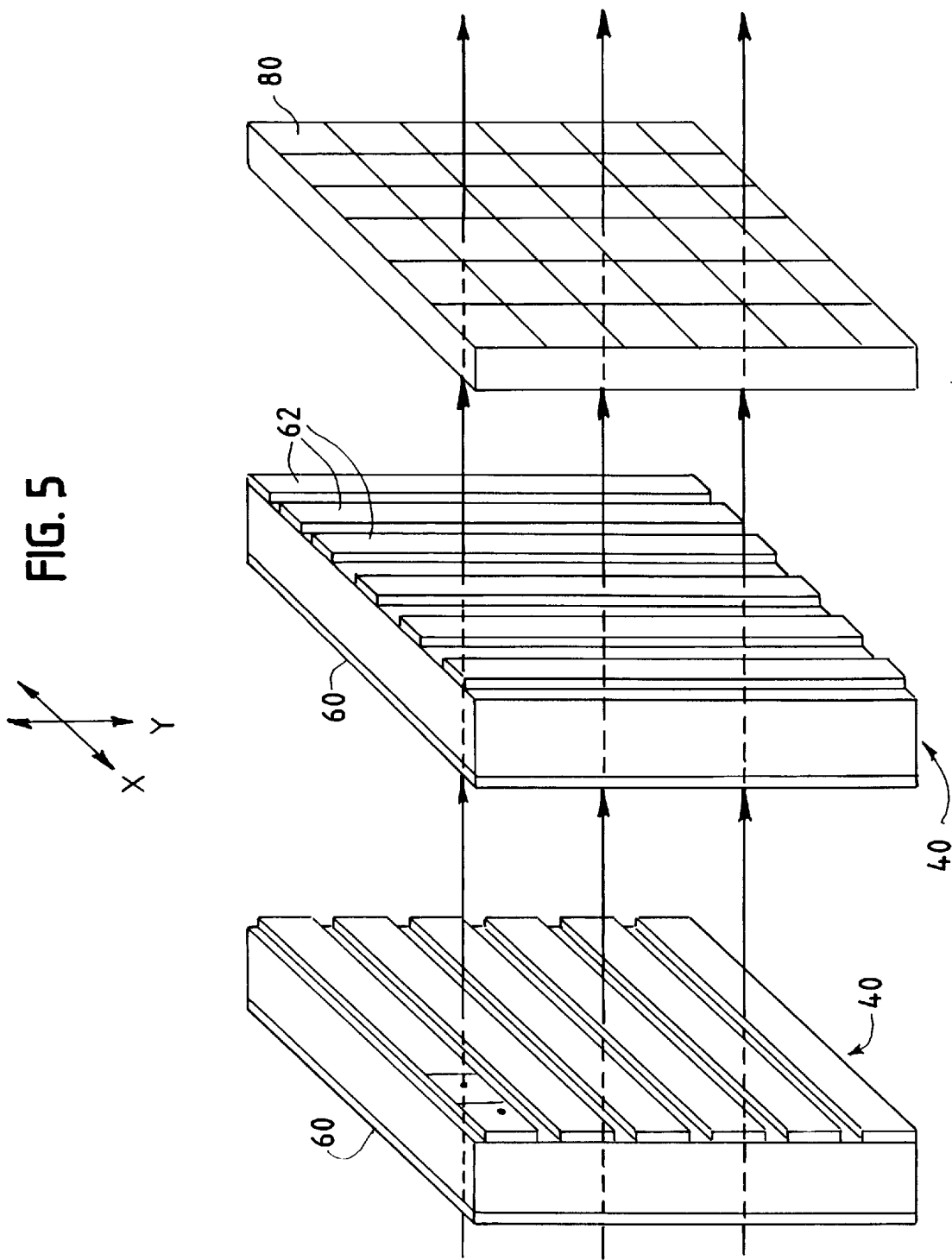
FIG. 5 is an alternate embodiment of a two-dimensional scanning phased array where two one-dimensional arrays of phase shifters are stacked.
Figure 6:
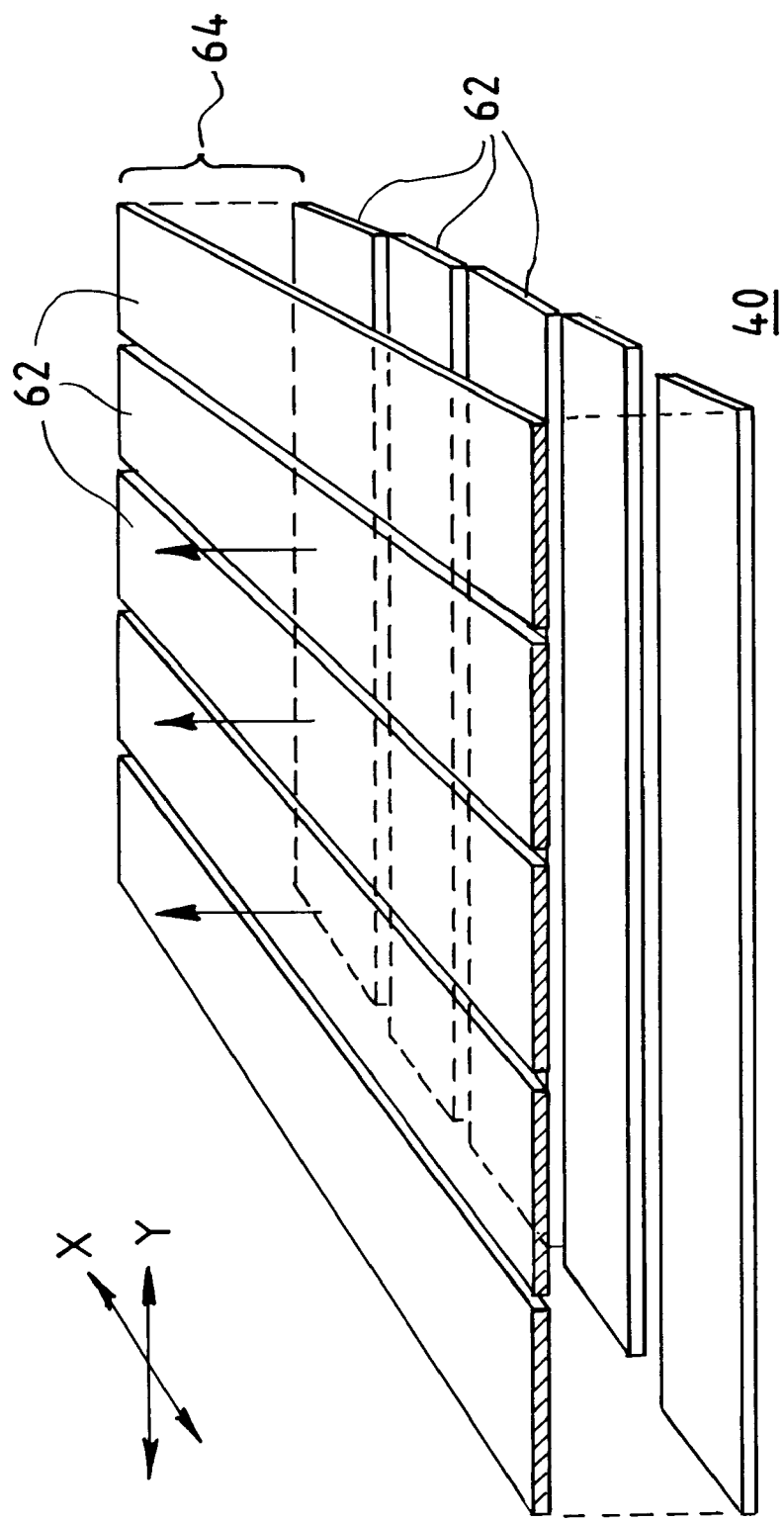
FIG. 6 is an alternate embodiment of a two-dimensional scanning phased array where electrode stripes are placed on opposite surfaces of electro-optical material.

Referring now to FIGS. 2, 5, and 6, FIG. 5 illustrates a two-dimensional array 40 formed from two one-dimensional arrays oriented at an angle of ninety degrees relative to each other. FIG. 6 illustrates a two-dimensional array having oppositely oriented electrodes disposed on opposite planar surfaces of an electro-optic substrate.

In FIG. 5, two one-dimensional arrays 40 are stacked together with the electrode strips 62 of each array disposed at a ninety degree angle relative to the other array. Each one-dimensional array 40 includes electrode strips 62 and common electrode 60. One of the arrays 40 scans in one dimension while the other array scans in the second dimension. Preferably, the first and second dimensions are orthogonal to each other. Note that each one-dimensional array 40 may be formed according to any of the described embodiments.

In FIG. 6, the electrode stripes 62 are placed on opposite planar surfaces of the electro-optical material 64 where electrode stripes on opposite surfaces are orientated at a ninety degree angle relative to each other. Thus, the array 40 is capable of steering a beam of light in two dimensions. In this embodiment, the common electrodes 60 (FIG. 5) are essentially eliminated. This is a simplified configuration relative to the configuration of FIG. 5. Instead of using the single common electrode 60 (FIG. 5), electrode stripes 62 are disposed on opposite surfaces of the electro-optic material 64. Preferably, each electrode stripe 62 has a width equal to the width of the electrode stripes 62 shown in FIG. 2.

In this alternate embodiment, the control signals 71 (FIG. 2) provided to the electrode stripes 62 by the control voltage generator 70 (FIG. 2) is varied from a predetermined reference potential $V_0$, to a predetermined control potential $V_1$, where $V_1 > V_0$. This steers the beam of light in the first dimension. The control signals 71 provided to the oppositely disposed electrode strips 62 are varied from $V_0$ to $V_2$, where $V_2 < V_0$. This steers the beam of light in the second dimension. Preferably, $V_0 = 0$. For a liquid crystal material, $V_1$ and $V_2$ are approximately +10 volts and -10 volts, respectively. Therefore, the overall potential difference between electrodes 62 on opposite surfaces of the electro-optical material 64 is the potential difference between the electrode stripes 62. The maximum phase shift required is two wavelengths.

In either of the above-described embodiments of FIG. 5 or FIG. 6, the lenses 80 (FIG. 2) exist as a two-dimensional array, $80_{(ij)}$, where i=1 ... n, and j=1 ... m where n is the number of electrode stripes 62 in a first dimension, for example, in an "X" direction, and m is the number of electrode stripes in a second dimension, for example, in a "Y" direction. Therefore, the total number of lenses 80 in the array of lenses $80_{(i,j)}$ is equal to the value of n times m.

Referring to FIG. 2, blocking stripes $100_1$–$100_9$, collectively referred to as blocking stripes 100, are affixed to the rear window 44. The blocking stripes 100 are optically non-transparent and may be disposed on the array 40 in a one-dimensional pattern or in a two-dimensional pattern, depending upon the dimensionality of the array 40. The blocking stripes 100 prevent light from passing through the spaces 102 between the phase shifters 72.

Figure 7:
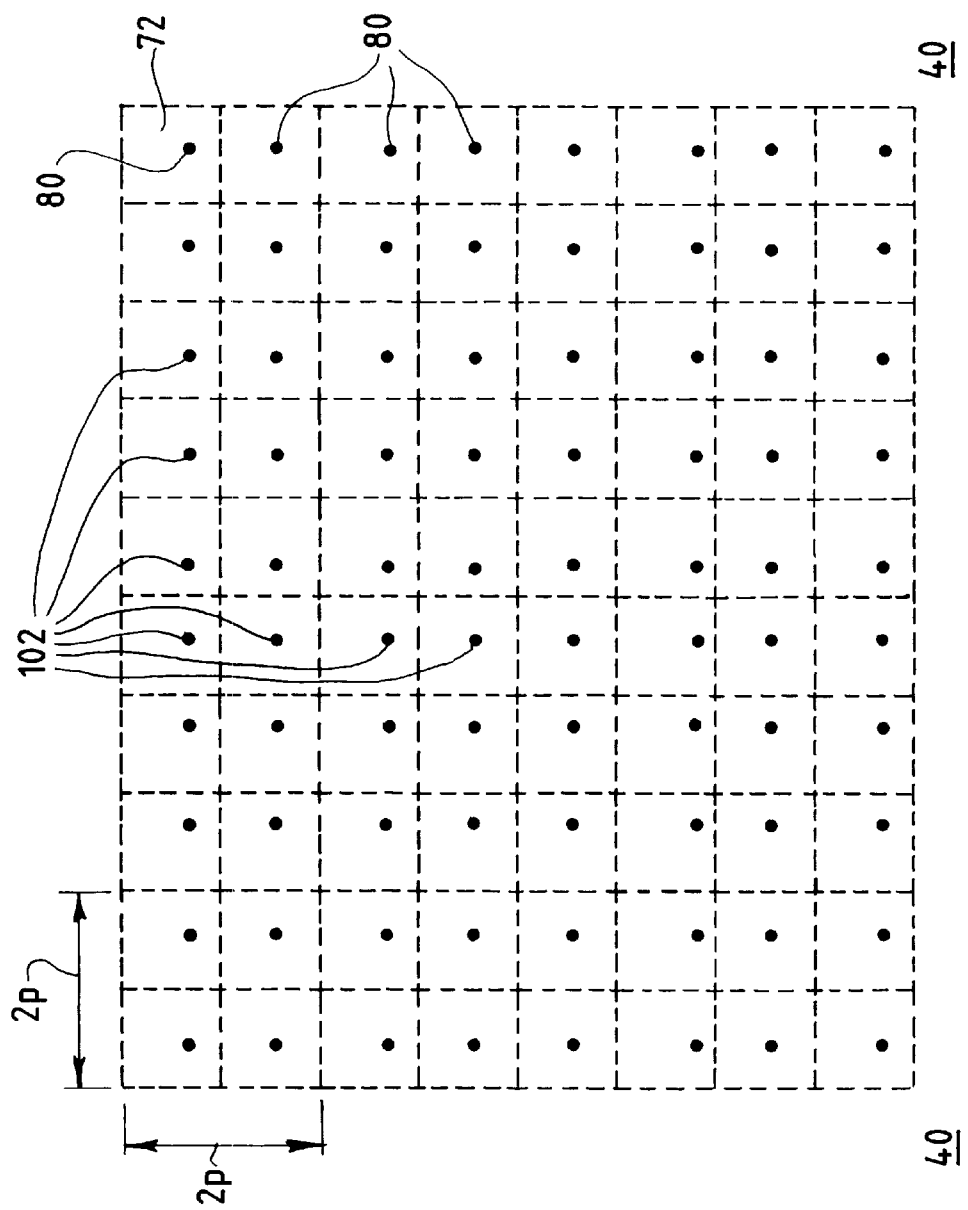
FIG. 7 is simplified top plan view of a two-dimensional phased array particularly illustrating non-uniform placement of optical axes of the lenses.

Referring now to FIGS. 2 and 7, in FIG. 7 the filled circles 102 represent the effective position of each phase shifter 72 of the array 40, i.e. the focal point 84 (FIG. 2) of each lens, while the dashed lines represent the boundary of the phase shifters. In one embodiment, the focal points 84 are aligned as rows and columns, but the distance between the rows and columns is non-uniform but precisely known. This is a significant feature in the present invention that eliminates unwanted multiple peaks, as is described above.

In known methods for providing beam steering, the array 40 is arranged in a uniform pattern, i.e. the center-to-center distance between each phase shifters 72 is constant. This conventional approach usually limits the center-to-center spacing of the phase shifters 72 to less than one wavelength (typically $\lambda/2$) in order to avoid multiple output beams or peaks. In the illustrated embodiment of FIG. 7, the phase shifters 72 are large (for example, 500 $\lambda$), and accordingly, the center-to-center spacing of the phase shifters is also large, thus multiple beams are expected.

However, use of an irregularly arranged array 40 having the non-uniform effective distance between phase shifters 72 overcomes the multiple beam problem associated with large phase shifters, as described above. The effective distance is defined by the distance between the focal points of the lenses associated with each phase shifter where such distance does not have a fixed value and there is no fixed relationship among the various distances. Any irregular pattern of non-uniform spacing may be used wherein the effective distance varies between focal points of the phase shifters 72. Due to such an irregular pattern, only one all in phase beam of light in the desired direction exists. This beam of light is effectively steered by application of the control signals 71 (FIG. 2) to sequentially alter the phase of each phase shifter 72, as will be described hereinafter. In this illustrated embodiment, the position of each phase shifter 72 in the array 40 may be placed according to the above described non-uniform arrangement. Random or pseudo-random placement of the phase shifters 72 may be easily accomplished by known semiconductor fabrication techniques.

Referring now to FIGS. 2, 4, and 7, in FIG. 7 the focal point of the lenses 80 represents the effective position of the phase shifters 72, therefore the actual physical position of the phase shifters is not determinative. In other words, the lens 80 may be configured to provide an irregular "virtual" or effective position of the phase shifter 72 by merely shifting the focal point 84 or optical axis 90 (FIG. 2) of the lenses 80. This means that the phase shifters 72 may be placed in a uniform position while the lenses 80 act to shift the position of each phase shifter to a virtual position. This approach not only simplifies the manufacture of the array of phase shifters 40, but also greatly enhances the overall efficiency, since the spacing between the phase shifters can be a fixed value d (FIG. 2) that may be very small (submicron). Similarly, if the phase shifters 72 are positioned in a random pattern, the spacing d varies. For example, to achieve position randomization in the range of p to 2p, the spacing d must vary between 0 to p, and the average spacing will be p/2. Any suitable random or pseudo-random pattern may be used. For example, a uniform distribution of randomized values may be used. Note that the light incident on the space between phase shifters cannot be used. Therefore, the larger the spacing, the lower the efficiency. Having an average spacing of p/2 means that the overall efficiency is reduced by about 30%. Using the above-described lens approach, this loss is minimal for even a large range of randomization from 0 to 2p.

In such an alternate embodiment, a virtual irregularly arranged array is formed where the electrode stripes 62 are identical and regularly arranged with the center-to-center distance of each phase shifter 72 defined as p. A virtual irregularly arranged array 40 is obtained by changing the focal points 84 of the lenses 80 by shifting the position of the optical axis 90.

In FIG. 4, the focal point 84 of the lens 80 is varied with respect to a center line 104 of the phase shifter 72 by forming the lens in an asymmetric configuration. Thus, the effective position of the phase shifters 72 is shifted by appropriate configuration of the lenses 80. The position of the focal points 84 of the lenses 80 may have maximum variation of 0.5p around the center of each phase shifter. Therefore, the distance between the effective positions of adjacent phase shifters may have maximum variation of 2p. For example, if focal points 84 from two adjacent phase shifters 72 are moved toward each other so that they are essentially adjacent or border each other, the spacing between focal points is defined to be about zero. If two focal points 84 are moved away from each other so that they are located at opposite sides of adjacent phase shifters 72, the spacing between focal points is defined to be about 2p. Thus, in the illustrated embodiment, the phase shifters 72 may be placed at uniform positions while the lenses 80 are configured to shift the focal point 84 in a non-uniform manner to form a virtual irregular array 40.

Referring now to FIGS. 2, 7, and 8–10, FIGS. 8–10 illustrate two-dimensional individually addressable arrays 40. In the alternate embodiments of FIGS. 8–10, the focal points 84 (FIG. 2) may not necessarily be aligned in rows and columns and may have a random, but precisely known position, as was described above with respect to FIG. 7.

Figure 8:
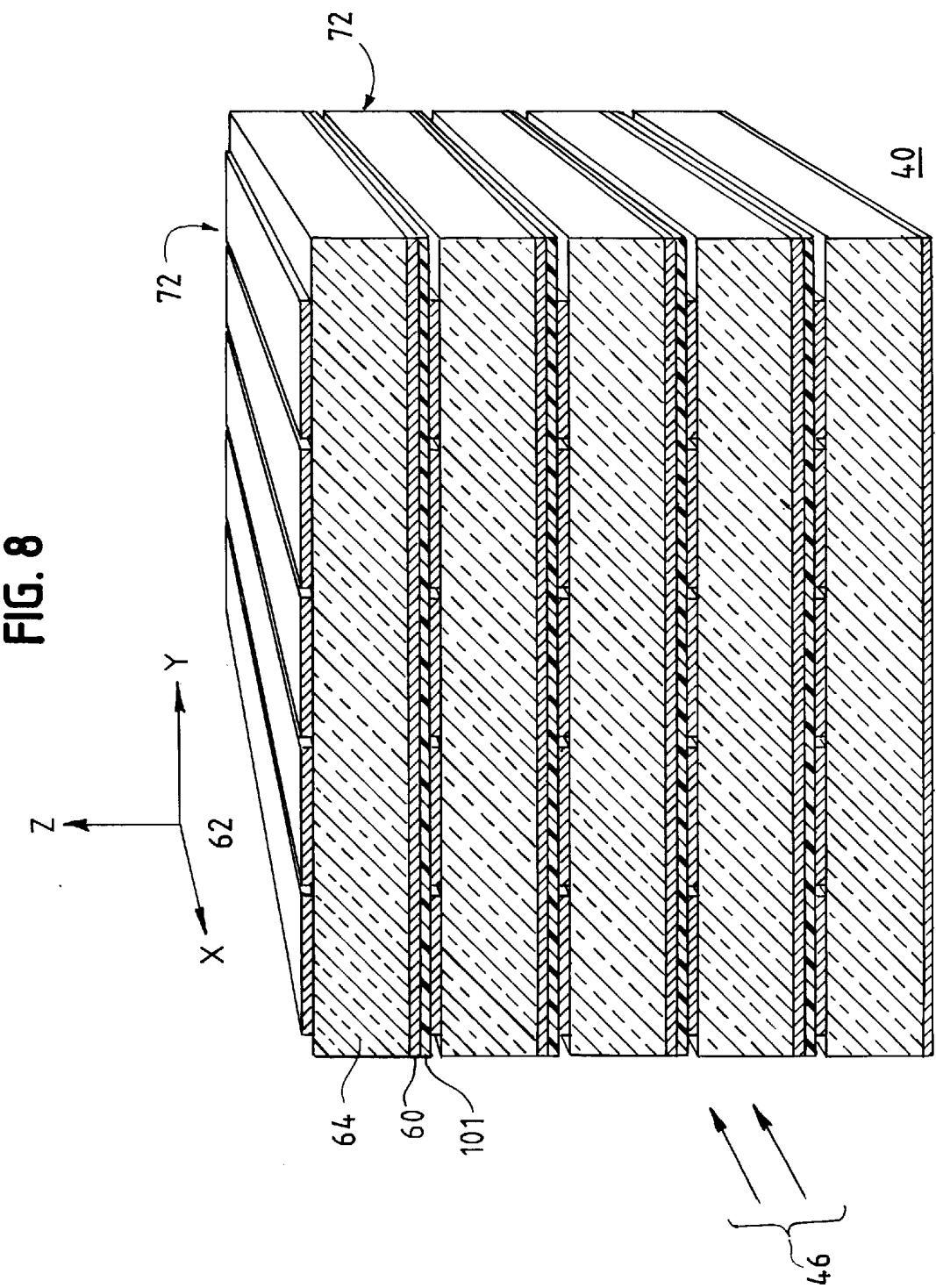

In FIG. 8, a two-dimensional array 40 of phase shifters 72 is shown where the incident light 46 is in the "X" direction. This array 40 employs a transverse modulation scheme since the direction of an electric field in the "Z" direction is perpendicular to the direction of light propagation. The electric field is in the Z direction is generated by the electrical potential difference between the electrode stripes 62 and common electrode 60. All elements of the array 40 are independently addressable to provide two-dimensional beam steering. An insulating layer 101 separates stacked arrays 40 where the array is formed from solid electro-optical material.

In FIGS. 9A and 9B, an alternate embodiment of a two-dimensional array 40 of phase shifters 72 is shown where longitudinal modulation is employed. Longitudinal modulation means that the direction of the electric field is parallel to the direction of light propagation. Incident light 46 enters the array in the X direction while the direction of the electric field is also in the X direction. In this embodiment, all electrodes 60 and 62 and electrical leads 104 that attach to each electrode are optically transparent. A layer of optically transparent insulating material 105 separates the electrical leads 104 from the electrodes 62 so that contact is made with selected electrodes only.

Figure 10:
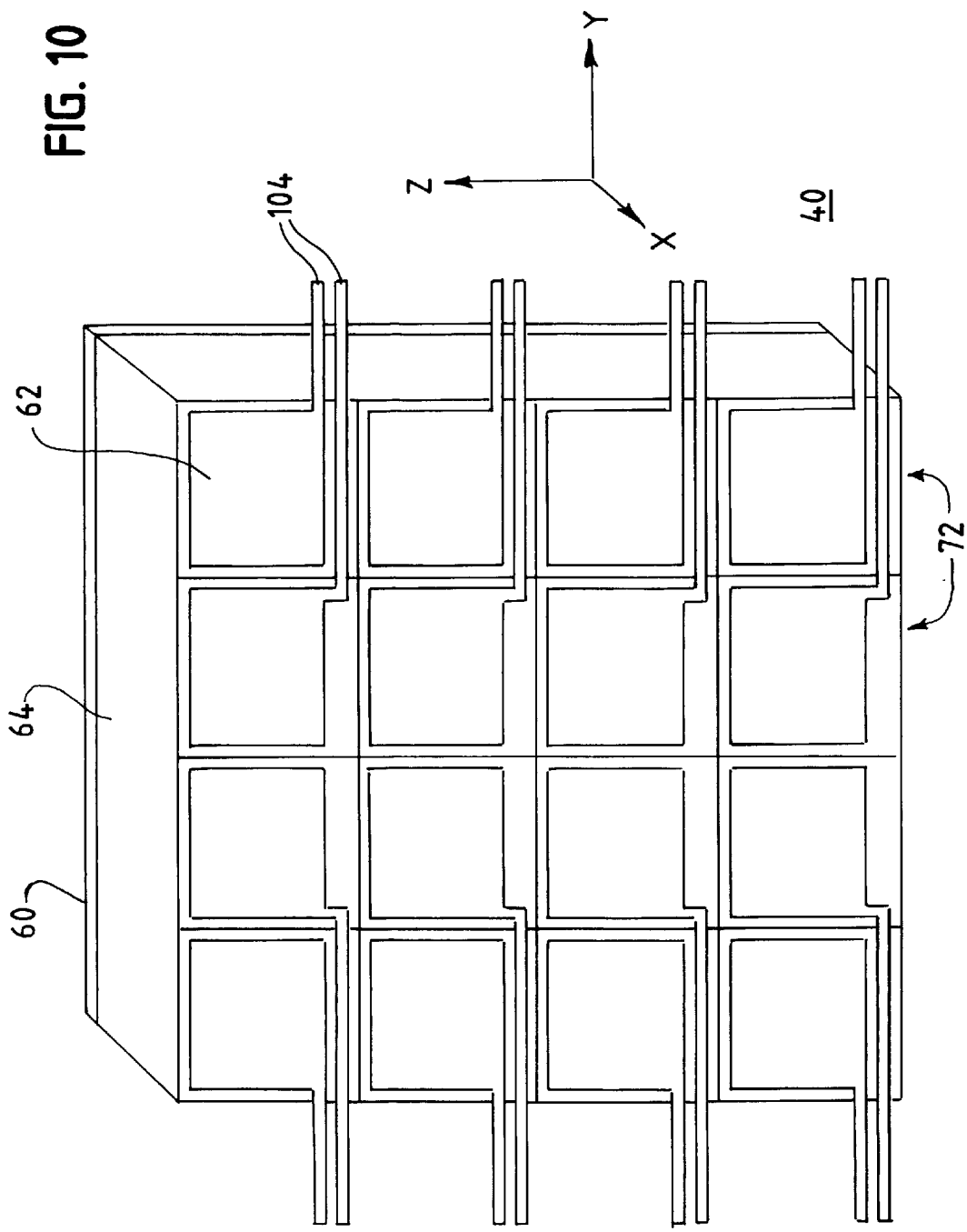

In FIG. 10, the two-dimensional array 40 of phase shifters 72 employs longitudinal modulation and is similar to the embodiment of FIG. 9B, except that the electrical leads 104 from each electrode 62 are placed between individual phase shifters.

Figure 11A:
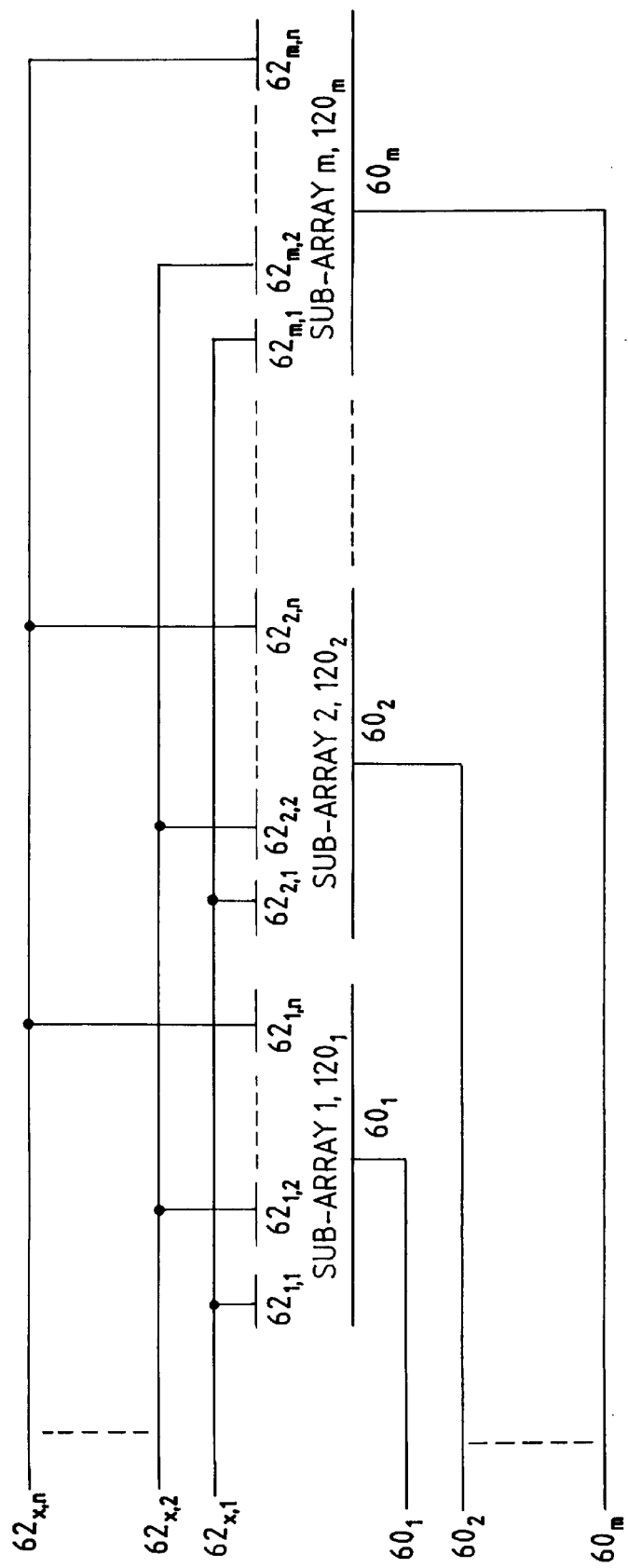
FIGS. 11A–11C are simplified schematic views of a sub-array scheme according to the present invention.

Referring now to FIGS. 2 and 11A, FIG. 11A illustrates a sub-array addressing scheme. One method for reducing the number of connections between the array 40 and the control voltage generator 70 (FIG. 2) is to divide the array 40 into sub-arrays $120_1$–$120_m$, collectively referred to as sub-arrays 120. Identical reference numerals identify like structures. As shown in FIG. 11A, the sub-arrays 120 are identical and are electrically connected in a parallel configuration by interconnecting corresponding electrodes 62 of each sub-array. The sub-arrays being identical means that the pattern of the position of the array elements or the effective positions of phase shifters are substantially identical for each sub-array. The actual physical size, shape, and position of the phase shifters and lenses may be or may not be identical. Prior art methods use a single common electrode 60 for the entire array 40. Although such known methods may reduce the number of off-chip connections, only a limited number of discrete beam positions can be addressed due to problems associated with beam phase mismatch among the sub-arrays 120.

The present invention overcomes the above-described phase mismatch problem while significantly enhancing performance. Instead of using one common electrode 60 for all sub-arrays 120, each sub-array has its own common electrode $60_1$–$60_m$, collectively referred to as common electrodes 60. The control voltage generator 70 (FIG. 2) individually controls each common electrode 60 as well as each control electrode 62.

As show in FIG. 11A, reference numerals $62_{(1,1)}$, $62_{(1,2)}$ ... $62_{(1,n)}$ represent the control electrodes 1, 2 ... n in sub-array $120_1$, while reference numerals $60_1$, $60_2$ ... $60_m$ represent the common electrodes for sub-arrays $120_1$, $120_2$ ... $120_m$, respectively. The voltage applied to each common electrode 60 ranges from zero volts to a predetermined negative value, while the voltage applied to the control electrodes 62 ranges from zero volts to a predetermined positive value. Of course, any potential references other than zero volts may also be used. Use of multiple common electrodes 60 substantially eliminates phase mismatch between the sub-arrays 120.

Figure 12A:
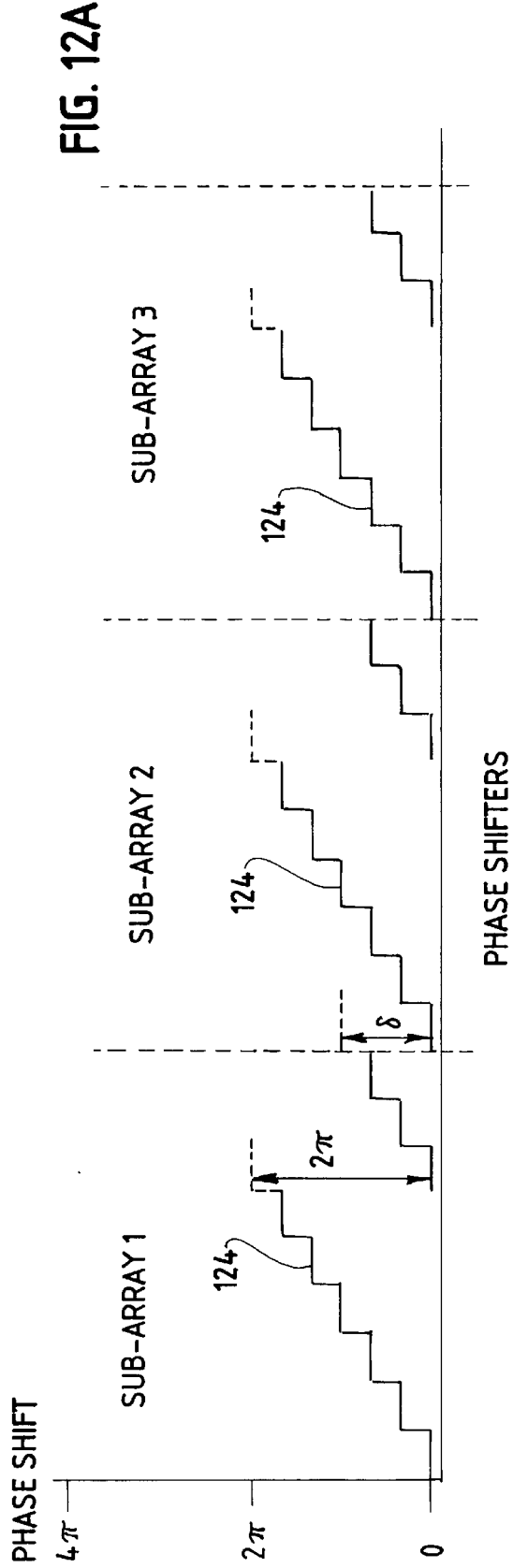
FIGS. 12A and 12B are schematic diagrams illustrating the phase shift relationship between sub-arrays.

Referring now to FIGS. 2, 11A, 12A, and 12B, FIGS. 12A–12B illustrate the phase shift relationship for the sub-arrays 120. In FIG. 12A, the stair-case graph 124 illustrates a prior art device where one common electrode 60 (FIG. 2) exists for all sub-arrays 40. Since the corresponding phase shifters 72 of each sub-array 120 (FIG. 11A) are interconnected through a single common electrode 60, the control signals 71 (FIG. 2) applied to the common electrodes of each sub-array are identical. Therefore, each sub-array 120 (FIG. 11A) exhibits the same pattern of phase shift. Accordingly, the phase front profile for each sub-array 120 is identical. In prior art of sub-array techniques, the light within each sub-array is all in phase in the desired direction. However, light between different sub-arrays 120 are in general not in phase. This limits the addressable beam directions to these few special directions where the light from each sub-array 120 may happen to be in phase.

Figure 11B:
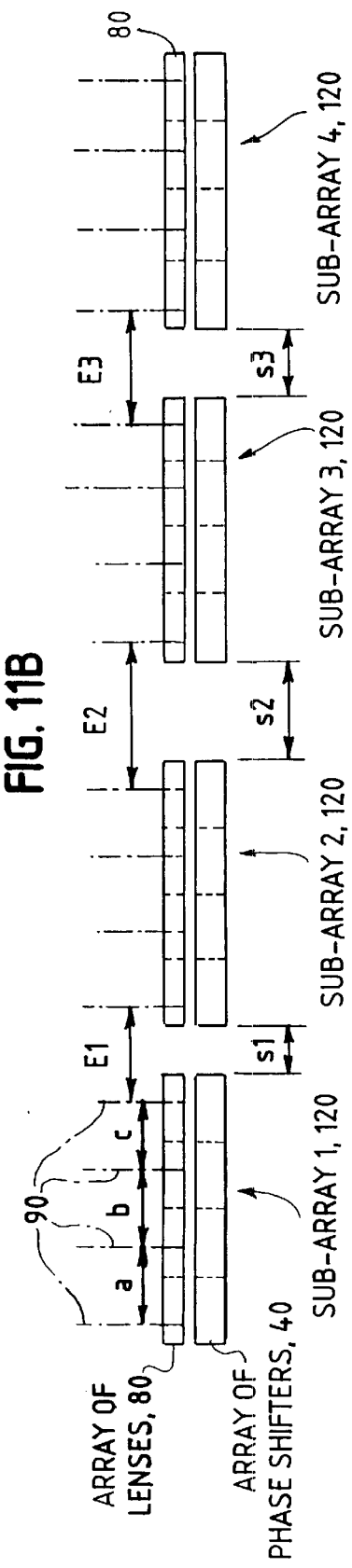
Figure 11C:
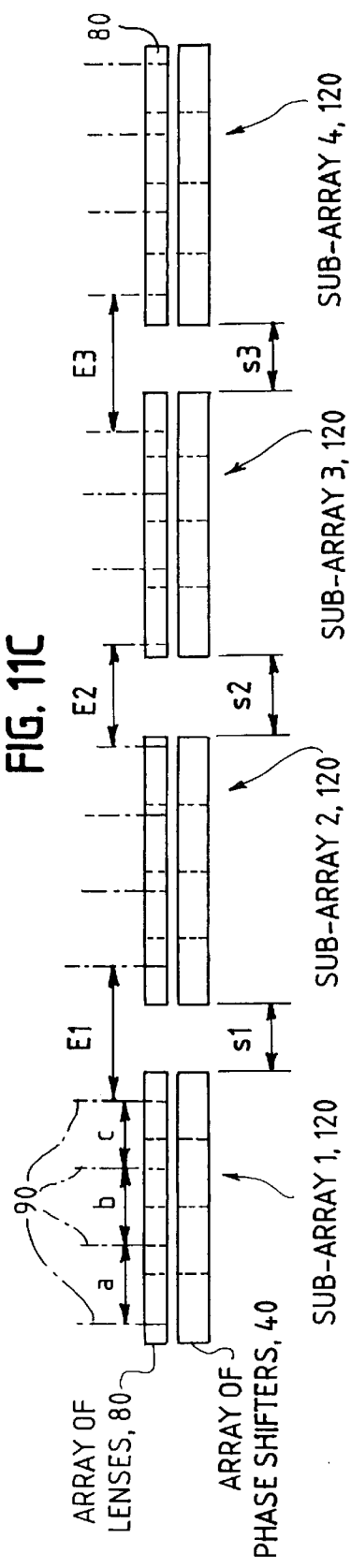

Referring now to FIGS. 2 and 11B–11C, effective irregular spacing between sub-arrays 120 is shown. The effective spacing is defined as the distance between the focal points on the boundary of sub-arrays, shown as E1–E3. The effective spacing between sub-arrays 120 must be substantially irregular, i.e. the spacing must be random within a predetermined range. Thus, not only must the arrangement of phase shifters 72 within a single sub-array 120 be random, but the distance between sub-arrays must also be random. It can be seen that if each sub-array 120 has an arrangement of randomly placed phase shifters 72, and if each sub-array is identical, then the randomness is effectively reduced if the distance between sub-arrays is uniform, since a correlation between phase shifters in each sub-array 120 would be inadvertently formed. Thus, the placement of each phase shifter 72 within the sub-array 120 must be random and the placement of each sub-array must be random relative to the other sub-arrays. For example, an array of 1024 elements or phase shifters 72 may be divided into 32 sub-arrays 120 where each sub-array has 32 elements. Since the sub-arrays 120 are regularly spaced, there are effectively only 32 elements positioned randomly. This may not be sufficient to cancel the light in undesired directions effectively. If the 32 sub-arrays are spaced randomly, there are effectively 1024 elements that are positioned randomly or pseudo-randomly, and the cancellation of light in undesired directions is much more effective.

In FIG. 11B, the position of the optical axes 90 relative to the sub-array 120 is fixed and equal for all sub-arrays. The effective irregular spacing between sub-arrays 120 is achieved by adjusting the spacing between the sub-arrays, i.e. in general, s1 s2 s3. In the illustrated embodiment, the spacing between the sub-arrays 120 is defined as the spacing between the boundary of adjacent sub-arrays.

Figure 11D:
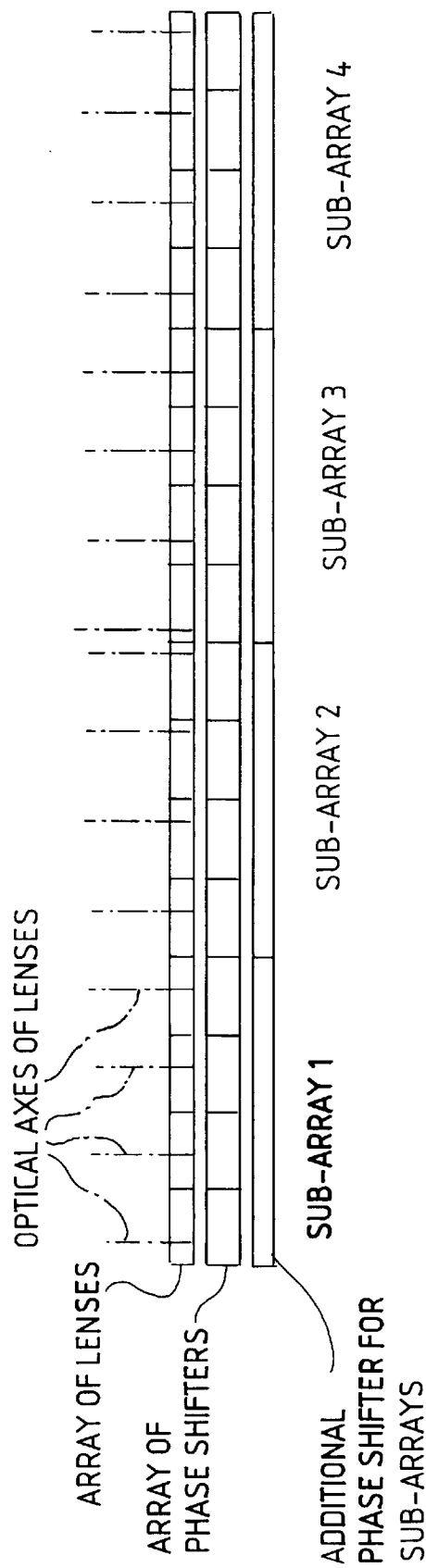

In FIG. 11C, the spacing between the sub-arrays 120 is kept substantially constant, i.e. s1=s2=s3, and the effective irregular spacing between sub-arrays is achieved by adjusting the position of the optical axes 90 of the lenses 80 relative to the sub-array. This is accomplished by shifting each optical axis 90 in one sub-array 120 by an equal amount. The amount of shift for each sub-array 120 is different and has a random pattern. Additional amount of shift can be achieved by an array of additional phase shifter shown in FIG. 11D. For a integrated array 40, the array of FIG. 11C is preferred since the spacing between sub-arrays 120, s1, s2, s3, can be maintained at near sub-micron dimensions to enhance the efficiency of the array 40. If each sub-array 120 has its own separate source of light, the array 40 of FIG. 11B is preferred since the array of lenses 80 for each sub-array is identical.

Figure 12B:
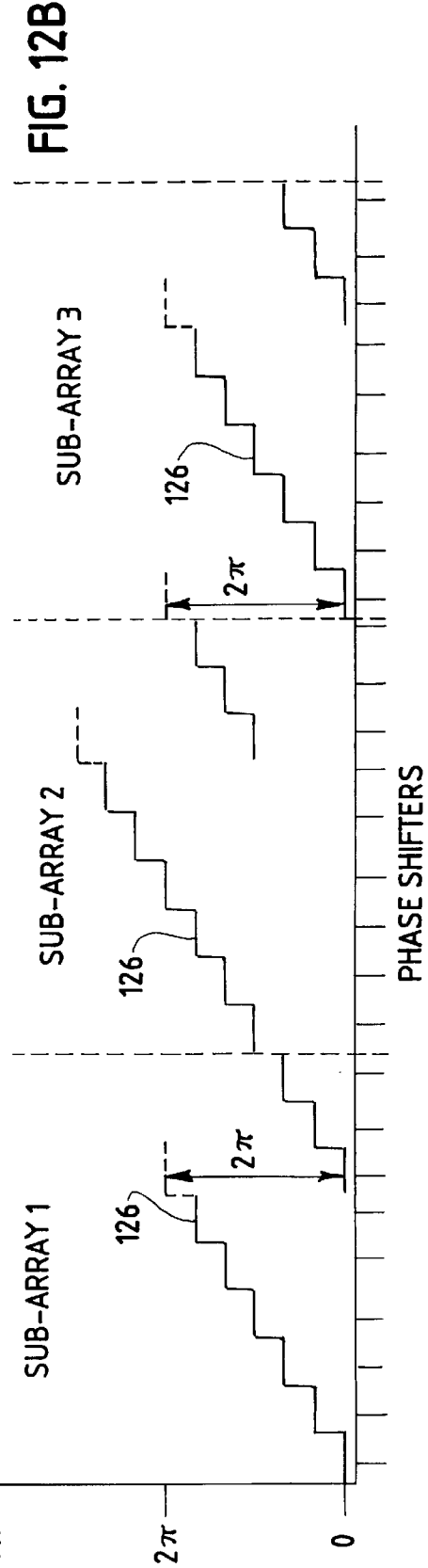

In FIG. 12B, it can be seen that by shifting the phase of the each sub-array 120 (FIG. 11) by a given amount, phase matching at the edges of the sub-array is realized, as shown by the stair-case graph 126 of FIG. 12B. This is accomplished by adjusting the voltage potential applied to the various common electrodes $60_1 \ldots 60_m$ of the sub-arrays 120 (FIG. 11). Obviously, the maximum phase shift needed is two wavelengths. Since the voltage applied to the common electrode 60 of each sub-array 120 (FIG. 11) is independently adjustable, the phase shift of all sub-arrays can be "fine-tuned." Therefore, if δ, as shown in FIG. 12A, is not equal to 2π, the voltage applied to the common electrode 60 of each sub-array 120 can be adjusted such that a desired phase match is obtained, as shown in FIG. 12B.

In FIG. 11C, the array of lenses for each sub-array are not identical, and only the array of the focal points or the pattern of the array elements are equal for each sub-array. Using the sub-array approach, the overall number of connections to the phased array 40 are greatly reduced. For example, an array having 1024 phase shifters can be divided into 32 sub-arrays where each sub-array contains 32 phase shifters. The total number of connections from the control voltage generator 70 to the control electrodes 62 (FIG. 11A) and the common electrode 60 is the sum of 32+32, which equals 64. In this embodiment, the corresponding electrode 62 in each sub-array 120 is interconnected.

Referring now to FIGS. 2, and 13A–13B, FIGS. 13A and 13B illustrate construction of the array 40 using solid electro-optical material 128. In this alternate embodiment, solid electro-optical materials are used to construct the array 40 by replacing the liquid crystal material 64 (FIG. 2). Although the electro-optical effects induced in solid materials 128 are usually smaller in magnitude than the electro-optical effects induced in liquid crystal materials, the response time of the solid material is usually much shorter than the response time of the liquid crystal material. The front and rear windows 42 and 44 (FIG. 2) are eliminated since the solid material retains its shape and form.

In the alternate embodiment shown in FIG. 13A, the electrical field is parallel to the direction of propagation of light, and therefore the array 40 employs longitudinal phase modulation. The control electrodes 62 or electrode stripes and the common electrodes 60 are directly affixed to the solid electro-optical material 128. Some examples of solid electro-optical material include: $LiNbO_3$, $TiTaO_3$, BBO, KDP, KD*P, BSO, BGO, KTP, $KNbO_3$, $LiIO_3$, and ZnSe. However, many other materials not explicitly described may be used, as is known in the art.

In FIG. 13B, transverse phase modulation is employed. Each phase shifter 76 in the array 40 may be constructed from electro-optical material in the form of rectangular "planks", where electrodes 140 are disposed on opposite sides of a "block" or "plank" of electro-optical material 142 forming a phase shifter 144. Multiple phase shifters 144 are stacked together separated by a layer of insulating material 146. In this embodiment, the width of the planks is significantly larger than the wavelength of light λ. Known methods for fabricating stacked arrays involve vapor deposition techniques where the thickness of each deposited layer is very small, typically on the order of one to one-half of the wavelength of light.

Specific embodiments of an optical beam steering device according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. An electromagnetic radiation steering device for steering electromagnetic radiation having a predetermined wavelength, the device comprising an irregular array formed of a plurality of phase-controlled radiating elements having effective positions which are randomly arranged to form a known irregular pattern, wherein an average distance between the effective position of each phase-controlled radiating elements and adjacent effective positions of said phase-controlled radiating elements is substantially greater than the wavelength of the radiation, and said distances have no fixed relationship with each other, such that multiple-beam output of said radiation can be eliminated.

2. The device according to claim 1 wherein the electromagnetic radiation is light.

3. The device according to claim 2 wherein each phase-controlled radiating element comprises a phase-controlled light emitter.

4. The device according to claim 2 wherein the average distance between the effective positions of adjacent phase-controlled radiating elements is ten times to a few thousand times the wavelength of the light.

5. The device according to claim 2 wherein said phase-controlled radiating elements include means for generating a virtual array defining the effective positions of the phase-controlled radiating element.

6. The device according to claim 2 wherein each phase-controlled radiating element includes a focusing element, each focusing element having a focal point which defines the effective position of each phase-controlled radiating element.

7. The device according to claim 2 wherein each phase-controlled radiating element includes a phase shifter.

8. The device according to claim 3 wherein the phase-controlled light emitters have a width which is substantially greater than the wavelength of the light.

9. The device according to claim 7 wherein the phase shifters have a width which is substantially greater than the wavelength of the light.

10. The device according to claim 3 wherein the irregular pattern of the effective positions corresponds to irregular positions of the phase-controlled light emitters.

11. The device according to claim 7 wherein the irregular pattern of the effective positions corresponds to irregular positions of the phase shifters.

12. The device according to claim 6 wherein the focusing elements are lenses.

13. The device according to claim 5 wherein the means for generating a virtual array of effective positions include diverging lenses.

14. The device according to claim 12 wherein the irregular pattern of effective positions of the irregular array elements is formed by an irregular pattern of shifted optical axes of the lenses.

15. The device according to claim 5 wherein the phase-controlled elements comprise phase shifters, and the means for generating a virtual array are located at one of behind and in front of the phase shifters.

16. The device according to claim 1 wherein the irregular array comprises a plurality of sub-arrays of phase-controlled elements, and wherein the effective spacing between the sub-arrays is irregular.

17. The device according to claim 16 wherein the sub-arrays are identical to each other, and each sub-array has a common control electrode that is coupled to control signals independently with respect to other sub-arrays.

18. The device according to claim 16 wherein the phase-controlled radiating elements in each of said sub-arrays are irregularly located relative to each other.

19. The device according to claim 16 wherein the sub-arrays are disposed in a regular pattern and comprises means for creating the irregular effective spacing between the sub-arrays.

20. The device according to claim 16 wherein corresponding phase-controlled elements of every sub-array are coupled in parallel to phase-control signals.

21. The device according to claim 16 wherein each sub-array further comprises means for shifting the phase of radiation from the phase-controlled elements of each sub-array independently with respect to other sub-arrays.

22. An optical beam steering device for steering a beam of light having a predetermined wavelength, the device comprising an optical array having a plurality of control electrodes and a layer of electro-optical material, the control electrodes and the electro-optical material forming an array of phase shifters within the optical array; each phase shifter having an effective position in the optical array such that the average distance between the effective position of each phase shifter and adjacent phase shifters is substantially greater than the wavelength; and a plurality of optical focusing elements, each optical focusing element corresponding to a phase shifter in the optical array, each optical focusing element having a focal point defining the effective position of each phase shifter, thereby forming a randomly irregularly arranged array of effective positions such that multiple beam output can be eliminated.

23. The device according to claim 22 wherein the plurality of optical focusing elements forms an array of lenses.

24. The device according to claim 22 wherein the array of phase shifters are disposed in a regular pattern.

25. The device according to claim 22 further including means for providing control signals to the control electrodes to produce a progressive phase shift in light propagating through the phase shifters, the array of phase shifters including a plurality of sub-arrays of phase shifters such that the phase shifters in each sub-array are randomly irregularly arranged and the sub-arrays are also randomly irregularly located with each other, and corresponding phase shifters of each sub-array are connected in a parallel arrangement, said progressive phase shift facilitated by application of a first differing electrical signal applied to the corresponding phase shifters of the sub-arrays and by application of a second differing electrical signal additionally applied to each sub-array.

26. The device according to claim 25 wherein each sub-array comprises a common electrode that is coupled to control signals independently with respect to the other sub-arrays.

27. The device according to claim 23 wherein the array of lenses is arranged as a one-dimensional array of lenses where each lens is a cylindrical lens.

28. An optical steering device for steering an optical beam having a predetermined wavelength, the device comprising an irregular array of a plurality of phase-controlled elements having effective positions which are randomly arranged to form a known irregular pattern, wherein the average distance between adjacent effective positions of said phase-controlled elements is substantially greater than the wavelength of the optical beam, and the distances have no fixed relationship with each other such that multiple-beam output of said optical beam can be eliminated.

29. The device of claim 28 wherein said average distance between adjacent effective positions is ten times to a few thousands times of the wavelength of the optical beam.

30. The device of claim 28 wherein said phase-controlled elements comprise phase-controlled light emitters.

31. The device of claim 28 wherein each of said phase-controlled elements comprises a phase shifter.

32. The device of claim 28 further comprising means for forming a virtual array of effective positions of said phase-controlled elements.

33. The device of claim 32 wherein said means for forming a virtual array are located at one of behind and in front of the phase-controlled elements.

34. The device of claim 32 wherein said phase-controlled elements are regularly positioned, while said virtual array of effective positions corresponds to the known irregular pattern.

35. The device of claim 32 wherein said means for forming a virtual array are focusing means having focal points which correspond to said virtual array of effective positions, said focusing means being located at one of behind and in front of said phase-controlled elements.

36. The device of claim 32 wherein said means for forming a virtual array are diverging means provided in front of said phase-controlled, thereby defining the known irregular pattern of effective positions.

37. The device of claim 28 wherein said phase-controlled elements are arranged in two dimensions for steering the optical beam in two dimensions.

38. The device of claim 37 wherein the phase-controlled elements arranged in two dimensions have their respective effective positions aligned in rows and columns with distances between the rows and columns randomly irregularly arranged without fixed relationship among the distances.

39. An optical beam steering device for steering a beam of light having a predetermined wavelength, the device comprising an array formed of a plurality of phase-controlled elements having effective positions, and an array of optical elements for generating a virtual array of effective point source of light, diverging in a predetermined angle, said virtual array defining the effective positions of said plurality of phase controlled elements, thereby steering the beam of light with interference among the light from said phase-controlled elements through the effective positions.

40. The device of claim 39 wherein the effective position defined by the array of optical elements for generating a virtual array are randomly and irregularly arranged to form a known irregular pattern, wherein distances between adjacent effective positions have no fixed relationship with each other such that multiple-beam output of said beam of light can be eliminated.

41. The device of claim 39 wherein the array of optical elements for generating a virtual array includes one of an array of converging lenses and an array of diverging lenses.

42. The device of claim 39 wherein said phase-controlled elements include one of an array of phase-controlled light emitters and an array of phase shifters.

43. The device of claim 42 wherein the width of each phase shifters is greater than the wavelength by ten times to a few thousand times.

44. An optical beam steering device for steering a beam of light having a predetermined wavelength, the device comprising a layer of electro-optical material, a plurality of first electrode stripes and a plurality of second electrode stripes being disposed, respectively, on opposite sides of the layer of electro-optical material and oriented at a ninety degree angle relative to each other, thereby forming a two dimensional array of phase shifters, each having an effective position; and an array of optical elements for generating a virtual array of effective point source of light, diverging in a predetermined angle, said virtual array defining the effective positions of said phase shifters in two dimensions, thereby steering the beam of light in two dimensions with interference among the light from said phase shifters.

45. The device of claim 44 wherein the effective positions are randomly irregularly arranged to form a known irregular pattern, such that distances between adjacent effective positions have no fixed relationship with each other, and the average distance between the adjacent effective positions is greater than the wavelength.

46. The device of claim 44 wherein control signals applied to the plurality of first electrode stripes are increased from a reference potential to a first predetermined potential and control signal applied to the plurality of second electrode stripes are decreased from the reference potential to a second predetermined potential.

47. The device of claim 45 wherein the effective positions in said virtual array are aligned in rows and columns, and distances between the rows and columns are randomly irregularly arranged and have no fixed relationship with each other.

48. An optical steering device for steering a beam of light having a predetermined wavelength, said device comprising a two dimensional array of phase-controlled elements, each of which has an effective position, and an array of optical elements for generating a virtual array of effective point source of light, diverging in a predetermined angle, said virtual array defining the effective positions of said phase-controlled elements in two dimensions, thereby steering the beam of light in two dimensions with interference among the light from said phase-controlled elements.

49. The device of claim 48 wherein the effective positions defined by the virtual array are aligned in rows and columns with distances between the rows and the columns randomly irregularly arranged such that the distances have no fixed relationship with each other.

50. The device of claim 49 wherein the phase-controlled elements are regularly arranged.

51. An optical steering device for steering a beam of light having a predetermined wavelength, said device comprising an array formed of a plurality of phase-controlled elements having effective positions, said array of phase-controlled elements including a plurality of sub-arrays, each of said sub-arrays having the effective positions of the phase-controlled elements randomly irregularly arranged to form a known irregular pattern, wherein the average distance between adjacent effective positions of said phase-controlled elements in each sub-array is substantially greater than the wavelength of the beam of light and the distances between the adjacent effective positions of said phase-controlled elements in each sub-array have no fixed relationship with each other such that multiple-beam output of said radiation can be eliminated.

52. The device of claim 51 wherein effective spacing between adjacent sub-arrays are randomly irregularly arranged but precisely known.

53. The device of claim 51 wherein effective spacing between adjacent sub-arrays are regularly arranged.

54. The device of claim 51 further comprising means for generating a virtual array defining the effective positions of the phase-controlled elements in accordance with the known irregular pattern.

55. The device of claim 51 further comprising means for creating a virtual array that defines the effective spacing between the sub-arrays.

56. The device of claim 51 wherein corresponding phase-controlled elements in each sub-array are coupled in parallel to control signals.

57. The device of claim 51 wherein each sub-array comprises additional phase shifters for shifting the phase of the beam of light from the phase-controlled elements of each sub-array independently with respect to other sub-arrays.

58. The device of claim 51 wherein each sub-array comprises a common control electrode for the phase-controlled elements of each sub-array, said control electrode being coupled to control signals independently with respect to other sub-arrays.

59. An optical steering device for steering a beam of light having a predetermined wavelength, said device comprising an array of a plurality of phase-controlled elements having effective positions, said array of phase-controlled elements including a plurality of sub-arrays, wherein effective spacing between adjacent sub-arrays are randomly irregularly arranged but precisely known such that multiple-beam output of said beam of light can be eliminated.

60. The device of claim 59 wherein said phase-controlled elements are regularly arranged, and include means for generating a virtual array that defines the effective positions of the phase-controlled elements in each sub-array in accordance with a randomly irregular known pattern such that distances between the effective positions have no fixed relationship with each other.

61. The device of claim 60 wherein the effective positions between the adjacent phase-controlled elements are aligned in rows and columns, and distances between the rows and columns are randomly irregularly arranged and have no fixed relationship with each other.

62. The device of claim 60 wherein the phase-controlled elements comprise transverse phase modulators.

63. The device of claim 60 wherein the phase-controlled elements comprise longitudinal phase modulators.

64. A method for steering a beam of light having a predetermined wavelength, comprising the steps of generating an array of phase-controlled elements, and arranging and said phase-controlled elements in respective effective positions which form a known irregular pattern, wherein the average distance between adjacent effective positions of said phase-controlled elements is substantially greater than the wavelength of the beam of light and the distances have no fixed relationship with each other such that multiple-beam output of said beam of light can be eliminated.

65. The method of claim 64 further comprising the step of providing means for generating a virtual array defining the effective positions of the phase-controlled elements to form the known irregular pattern, while the phase-controlled elements are arranged regularly.

66. The method of claim 64 wherein the array of phase-controlled elements includes a plurality of sub-arrays, each sub-array having the effective positions of the phase-controlled elements randomly irregularly arranged such that the distances between the adjacent phase-controlled elements in each sub-array have no fixed relationship with each other, and effective spacing between said sub-arrays are randomly irregularly arranged.

67. The method of claim 66 further comprising additional phase shifters for shifting the phase of the beam of light from each sub-array independently with respect to other sub-arrays.

68. The method of claim 64 further comprising the step of a common control electrode for each sub-array to be coupled to control signals independently with respect to the other sub-arrays.

69. The method of claim 64 further comprising the step of providing control signals to corresponding phase-controlled elements in each sub-array in parallel.

70. The method of claim 66 wherein the effective positions of the phase-controlled elements in each sub-array are arranged in two dimensions and aligned in rows and columns, and distances between the rows and columns are randomly irregularly arranged and have no fixed relationship with each other.

* * * * *